US010189214B2

(12) United States Patent
Ho Yew Chi et al.

(10) Patent No.: US 10,189,214 B2
(45) Date of Patent: Jan. 29, 2019

(54) FREESPACE COMPOSITE MANUFACTURING PROCESS AND DEVICE

(71) Applicant: Composite Cluster Singapore Pte. Ltd., Singapore (SG)

(72) Inventors: Peter Ho Yew Chi, Singapore (SG); Florian Doetzer, Singapore (SG); Chee Meng Lim, Singapore (SG); Klaus Drechsler, Feldkirchen (DE)

(73) Assignee: Composite Cluster Singapore Pte. Ltd., Singapore (SG)

(*) Notice: Subject to any disclaimer, the term of this patent is extended or adjusted under 35 U.S.C. 154(b) by 45 days.

(21) Appl. No.: 15/129,697

(22) PCT Filed: Mar. 30, 2015

(86) PCT No.: PCT/IB2015/052336
§ 371 (c)(1),
(2) Date: Sep. 27, 2016

(87) PCT Pub. No.: WO2015/145407
PCT Pub. Date: Oct. 1, 2015

(65) Prior Publication Data
US 2017/0151731 A1   Jun. 1, 2017

(30) Foreign Application Priority Data

Mar. 28, 2014 (SG) ............................ 10201401096X
Mar. 28, 2014 (SG) ............................ 10201401097V

(51) Int. Cl.
*B29C 70/38* (2006.01)
*B33Y 50/00* (2015.01)
(Continued)

(52) U.S. Cl.
CPC ........ *B29C 70/386* (2013.01); *B29C 35/0805* (2013.01); *B29C 70/38* (2013.01);
(Continued)

(58) Field of Classification Search
CPC .............. B29C 70/386; B29C 35/0805; B29C 2035/0838; B29K 2101/12; B05C 1/083; B05C 1/087; B05C 1/0882
(Continued)

(56) References Cited

U.S. PATENT DOCUMENTS 3,775,219 A * 11/1973 Karlson ................ B29C 70/388
156/353
3,970,831 A * 7/1976 Hegyi ...................... B25J 9/026
156/363

(Continued)

FOREIGN PATENT DOCUMENTS

DE           3226290      1/1984
DE           69001202     7/1993
(Continued)

OTHER PUBLICATIONS

Ho Yew Chi, Peter; International Search Report and Written Opinion for PCT/IB2015/052336, filed Mar. 30, 2015, dated Jun. 30, 2015, 7 pgs.

*Primary Examiner* — Dah-Wei D. Yuan
*Assistant Examiner* — Stephen A Kitt
(74) *Attorney, Agent, or Firm* — Taylor English Duma LLP

(57) ABSTRACT

The application provides a movable apparatus for forming a thermo-softening part. The apparatus includes a first placement unit, a second placement unit, and a heat source. The first placement unit comprises one or more first rollers, which are movable in a first predetermined path. The second placement unit comprises one or more second rollers, which correspond to the first rollers. The second rollers are movable in a second predetermined path. The heat source is provided for heating an elongated thermo-softening material to a predetermined temperature. The first rollers and the second rollers are provided on opposite sides of the elon- (Continued)

gated thermo-softening material for compressing the thermo-softening material to form the thermo-softening material.

18 Claims, 26 Drawing Sheets

(51) Int. Cl.
  *B29C 35/08* (2006.01)
  *B05C 1/08* (2006.01)
  *B32B 37/00* (2006.01)
  *B29K 101/12* (2006.01)

(52) U.S. Cl.
  CPC .............. *B33Y 50/00* (2014.12); *B05C 1/083* (2013.01); *B05C 1/0878* (2013.01); *B05C 1/0882* (2013.01); *B29C 2035/0838* (2013.01); *B29K 2101/12* (2013.01); *B32B 37/0046* (2013.01)

(58) Field of Classification Search
  USPC ......................................................... 156/242
  See application file for complete search history.

(56) References Cited

U.S. PATENT DOCUMENTS

| | | | |
|---|---|---|---|
| 6,096,164 A * | 8/2000 | Benson | B29C 53/602 156/425 |
| 6,451,152 B1 * | 9/2002 | Holmes | B23K 26/034 156/173 |
| 8,052,819 B2 | 11/2011 | Munaux et al. | |
| 8,191,596 B2 | 6/2012 | Hamlyn et al. | |
| 8,733,417 B2 | 5/2014 | Hamlyn et al. | |
| 2007/0187021 A1 | 8/2007 | Oldani et al. | |
| 2007/0274797 A1 | 11/2007 | Panczuk et al. | |
| 2009/0084486 A1 * | 4/2009 | Tang | B29C 70/386 156/64 |
| 2011/0245971 A1 | 10/2011 | Sarh et al. | |
| 2011/0277935 A1 | 11/2011 | Borgmann et al. | |
| 2012/0152432 A1 | 6/2012 | Pedigo et al. | |
| 2014/0083620 A1 | 3/2014 | Caffiau et al. | |
| 2014/0182787 A1 | 7/2014 | Caffiau et al. | |

FOREIGN PATENT DOCUMENTS

| | | |
|---|---|---|
| DE | 3852634 | 6/1995 |
| DE | 4431318 | 3/1996 |
| DE | 10250826 | 5/2004 |
| DE | 102006058097 | 6/2007 |
| DE | 202008014886 | 5/2010 |
| DE | 102009014488 | 9/2010 |
| DE | 102010023044 | 1/2011 |
| DE | 102010012719 | 9/2011 |
| DE | 102010013711 | 10/2011 |
| DE | 102010015199 | 10/2011 |
| DE | 102011102950 | 2/2012 |
| DE | 102012102204 | 9/2013 |
| DE | 102012007439 | 10/2013 |
| DE | 102012108487 | 3/2014 |
| DE | 102012017595 | 8/2014 |
| DE | 102013009047 | 12/2014 |
| DE | 102013107039 | 1/2015 |
| DE | 102013107103 | 1/2015 |
| DE | 102013108569 | 2/2015 |
| DE | 102013108570 | 2/2015 |
| EP | 0491355 | 6/1992 |
| EP | 1564135 | 8/2005 |
| EP | 2433784 | 3/2012 |

* cited by examiner

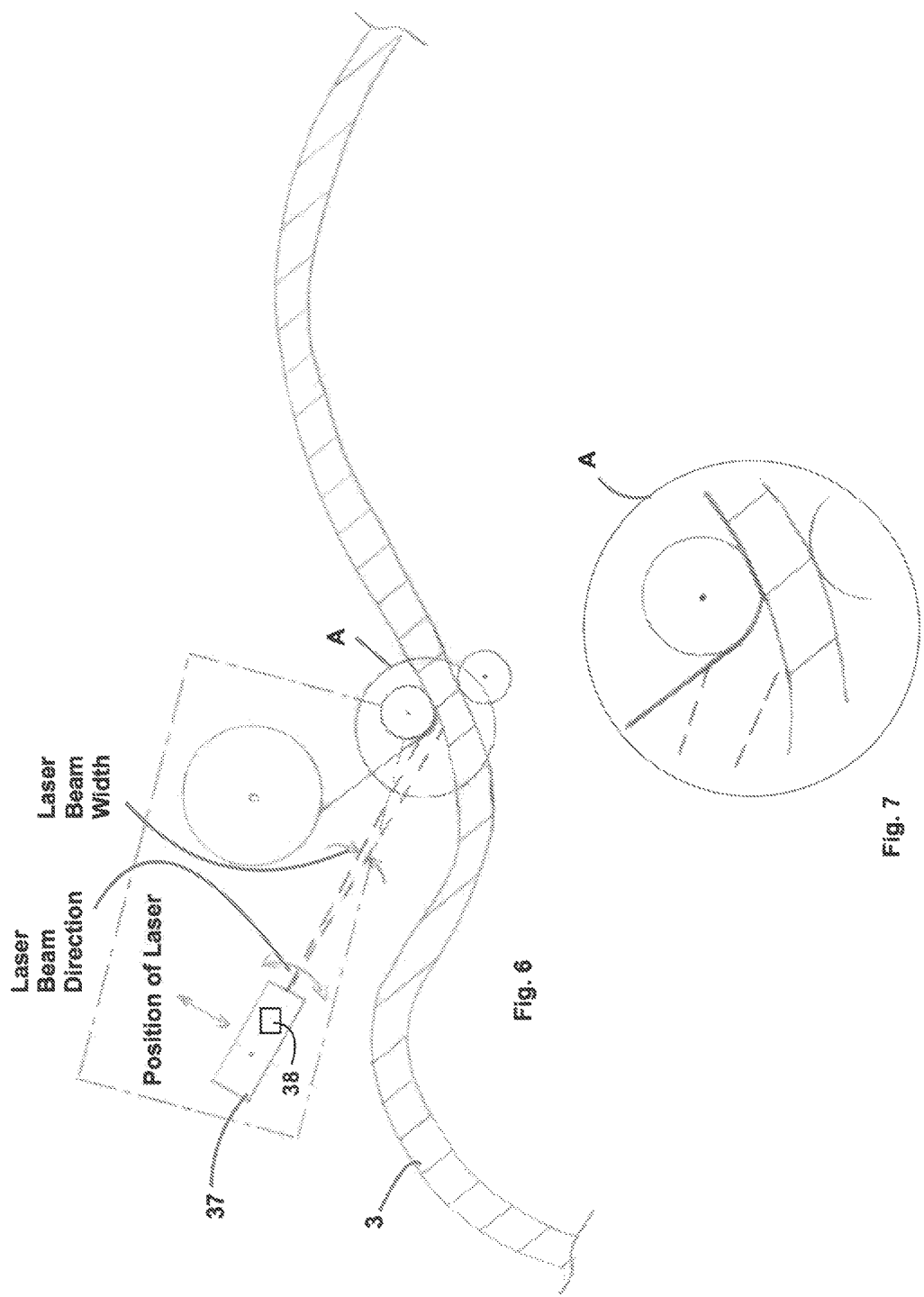

Fig. 15    1st Layer Base Structure

Fig. 16 — Adjustment to Compaction Rollers to adjust form of 1st layer base structure

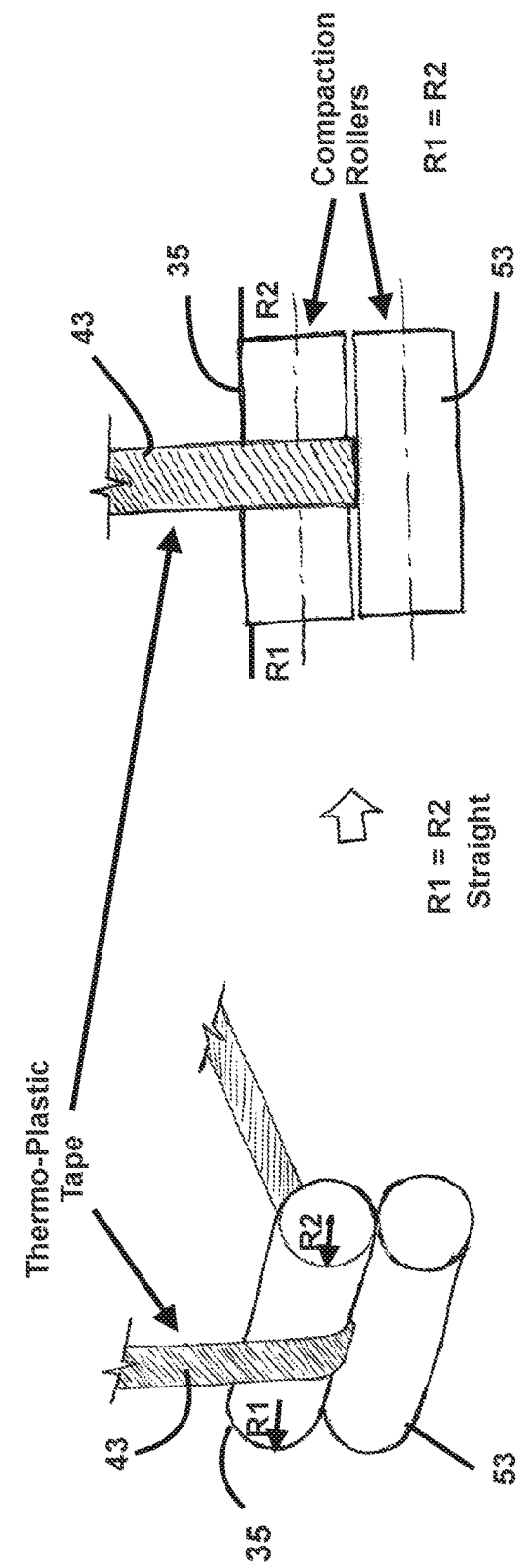

R1 < R2
Left

R1 < R2
D1 < D2

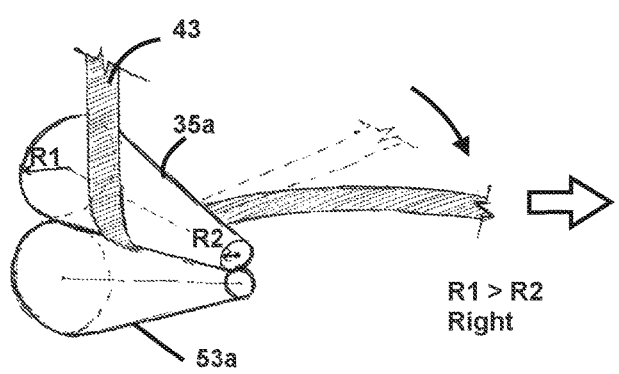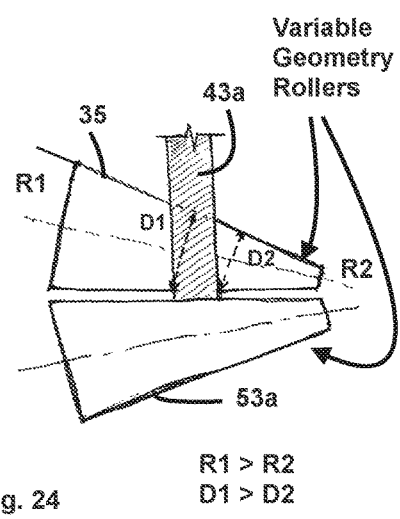
Fig. 23
Fig. 24

FREESPACE COMPOSITE MANUFACTURING PROCESS AND DEVICE

The application relates to a fiber placement apparatus. In particular, the application relates to an apparatus to form fiber-reinforced composite parts.

The fiber reinforced composite part usually has a large number of aligned fibers that are embedded in a matrix material. The matrix material usually refers to a viscous material that binds together the fibers and then hardens to provide shape to the composite part. The fibers can be in a dry form. The fiber can also be in the form of a reinforcing fabric, which is impregnated with thermo-softening matrix.

The fiber reinforced composite parts generally have superior strength and stiffness per weight when comparing to traditional metal components. The fiber reinforced composite parts are therefore suitable for high performance components, such as aircraft parts.

Traditionally, the fiber-reinforced composite parts are produced using fiber placement methods. The fiber placement methods refer to a kind of an additive manufacturing method that builds a three-dimensional object by adding layer-upon-layer of composite materials. These multiple layers of the composite material are typically placed on a tool surface, on a mould, or on a mandrel. The mandrel refers to a tool for clamping material. These layers are then compacted simultaneously and later cured to form a component of a predetermined shape.

The fiber placement methods allow the fiber-reinforced composite parts to have different designs and shapes.

US007080441 provides a device for automatically laying composite to manufacture a part. Examples of the device include a mandrel, a vertical movement shaft, a platform, one or more arm mechanisms, and one or more material delivery heads.

WO 2008129156 A1 provides a method and a device for making hollow parts of a composite material, in particular a composite material of the aircraft-fuselage section type, which includes a skin and optional reinforcing members.

It is an object of this application to provide an improved fiber placement apparatus.

This application provides a movable material placement apparatus for forming a thermo-softening part.

The material placement apparatus is intended to for attaching to robotic arms, wherein the robotic arm moves the material placement apparatus.

The thermo-softening part is made of or includes a material that softens at high temperatures and hardens at low temperatures. An example of a thermo-softening material is a thermoplastic material, which is in a viscous state at high temperatures and hardens at low temperatures.

The apparatus includes a first placement unit and a second placement unit.

In detail, the first placement unit includes one or more first rollers and a first heat source.

The first rollers are attached to first actuators, wherein the first actuators move the first rollers in a first predetermined path with respect to the material placement apparatus.

The heat source is provided for heating an elongated thermo-softening material to a desired temperature. The elongated thermo-softening material can be in a form of a tape or can be in a form of a bundle of fibers.

This desired temperature can refer to a shaping temperature, at which the thermo-softening material can be bended or shaped to a desired form or geometry. The desired temperature can also refer to a consolidating or fusing temperature, at which the thermo-softening material softens for fusing with another material.

The second placement unit includes one or more second rollers, which correspond to the first rollers.

The second rollers are attached to second actuators, wherein the second actuators move the second rollers in a second predetermined path with respect to the material placement apparatus.

The second predetermined path is often placed parallel essentially to the first predetermined path.

In use, the first rollers and the second rollers are provided on opposite sides of the thermo-softening material, such that the first rollers are placed near to the second rollers.

The first rollers and the second rollers are provided to compress a part of the thermo-softening material.

In one aspect of the application, the first rollers and the second rollers compress and shape the thermo-softening material to form a base structure.

In another aspect of the application, the first rollers and the second rollers compress and fuse the thermo-softening material onto a base structure to form a complete structure. the rollers may fuse more than one layer of the material onto the base structure.

This movable placement apparatus provides several advantages.

Merely one generic placement apparatus can be used for producing different thermo-softening parts. This is different from other devices, which have customized tools for producing different parts. One customized tool is used for producing one part.

The generic placement apparatus reduces production set-up time, which is required by customized tooling.

The placement apparatus also reduces cost, since cost related to the customized tools, which usually is the major cost factor for composite parts production, is avoided.

Similarly, longer lead time and risk related to the customized tooling are also eliminated.

The placement apparatus can produce parts of different sizes and shapes, thereby allowing flexibility of production.

The flexibility of process, in turn, improves or optimizes part supply chain, since production of normal parts can be handled together with production of urgently needed parts.

The placement apparatus also allows production of near net-shape structures with minimal scrap and minimal trimming.

Moreover, the placement apparatus permits a high degree of automation and allows production capabilities that operate 7 days a week and that operate 24 hours a day. This thus maximizes utility or usage of equipment and facilities.

This process, which is highly automated, also leads to quality improvements over lesser automated procedures.

Referring to the first placement unit, it often includes a first thermo-softening material storage and delivery device for storing the thermo-softening material.

The first thermo-softening material storage and delivery device can include a first reel for storing a first elongated thermo-softening material.

The first reel can be adapted for storing a first thermo-softening material in the form of a tape or a bundle of fibers. The fiber has a shape of a thin thread.

The first placement unit also often includes a first temperature sensor for measuring a temperature of the first thermo-softening material.

The temperature sensor can be provided by a thermal camera that provides a matrix of temperature readings for a given thermal image. In general, it is advisable or desirable to monitor different zones of a nip point, wherein the first thermo-softening material, the roller, and the base structure meet to ensure proper bond quality.

A position of the first temperature sensor is often fixed with respect to the first thermo-softening material storage and delivery device. The temperature reading can be used for controlling or regulating the cooling device or the heating device.

The first placement unit can also include a first distance measuring device for measuring a length of the compressed first thermo-softening material.

The first placement unit can also include a first thermo-softening material inspection device to monitor build quality of the finished part.

The inspection device can include a thermal camera or a vision camera to monitor the build quality. The inspection device can also provide real time process information to document the manufacturing process.

The first placement unit can also comprise a first device for cooling the thermo-softening material. The cooling device can include an active cooling device, which regulates a flow rate of a coolant for reducing the temperature of a part of the first thermo-softening material. The flow rate is increased or decreased such that the first thermo-soften material reaches a desired temperature.

The first heat source of the first placement unit can also include a laser generation device. The laser generation device provides a laser beam for melting an area of the first thermo-softening material.

The laser generation device can produce a laser beam with changeable operating parameters such as intensity, profile, size, and direction. A computer changes said operating parameters according to manufacturing process variation, thereby optimizing or improving a production of the thermo-softening part.

The first placement unit can also include a first pre-heating source. The pre-heating source acts to preheat the first thermo-soften material to a pre-heating predetermined temperature for preparing the thermo-soften material for forming.

The first placement unit can also include a first post-heating source, which acts to reduce mechanical stress and warpage in the first thermo-soften material due to avoid rapid cooling.

Referring to the second placement unit, it can include parts similar to the parts of the first placement unit.

The second placement unit can be configured to be similar to the first placement unit, thereby advantageously allowing the movable apparatus to place and fuse thermo-softening materials onto two different surfaces of the base structure.

The second placement unit often includes a second thermo-softening material storage and delivery device for storing a second thermo-softening material.

The second thermo-softening material storage and delivery device can include a second reel for storing a second elongated thermo-softening material.

The second reel can be adapted for storing a thermo-softening material in the form of a tape or a bundle of fibers.

The second placement unit also often includes a second temperature sensor for measuring a temperature of the second thermo-softening material.

The second placement unit can also include a second distance measuring device for measuring a length of the compressed second thermo-softening material.

The second placement unit can also include a second thermo-softening material inspection device to monitor build quality of the finished part.

The second placement unit can also comprise a second device for cooling the second thermo-softening material.

The second heat source of the second placement unit can also include a laser generation device.

The laser generation device can produce a laser beam with changeable operating parameters such as intensity, profile, size, and direction. The computer changes said operating parameters according to manufacturing process variation, thereby optimizing or improving the manufacturing process.

The second placement unit can also include a second preheating source. The pre-heating source acts to preheat the second thermo-soften material to a pre-heating predetermined temperature for preparing the second thermo-soften material for forming.

The second placement unit can also include a second post-heating source, which acts to reduce mechanical stress and warpage in the second thermo-soften material due to avoid rapid cooling.

The first placement unit and the second placement unit are adapted for immersing in liquid, such as water.

The liquid provides accelerated cooling of heated thermo-softening materials because the liquid has higher heat transfer rate than air, thereby allowing a shorter processing time.

Different shapes of the first and second rollers are possible. The first and second rollers can have a cylindrical shape. The first rollers and the second rollers can also have a shape of a partial cone. The partial cone shape allows finished thermo-soften material to have a curvature.

In one aspect of the application, the movable material placement apparatus includes a magnetic coupling device for attracting the first placement unit to the second placement unit by a magnetic force.

A robotic arm can be attached to the first placement unit to position the first placement unit at a desired position.

The second placement unit, which is attracted to the first placement unit, then follows the first placement unit to the desired position.

The second placement unit can be attached to a second robotic arm but is not necessary.

The magnetic coupling device has a benefit of allowing the rollers to apply a greater compressive force.

This application also provides a further movable material placement apparatus with a gripper for forming a thermo-softening part.

This apparatus includes a first placement unit, a heat source, and a second placement unit.

In detail, the first placement unit includes one or more first rollers. The first rollers are movable in a first predetermined path with respect to the material placement apparatus.

The heat source is provided for heating an elongated thermo-softening material to a desired temperature for shaping or fusing the thermo-softening material.

The second placement unit includes a gripper for supporting and holding a part of the thermo-softening part such that that the part does not slide or move perpendicularly with respect to the first determined path.

In use, the first rollers and the gripper are provided on opposite sides of the thermo-softening material, such that the first rollers are placed near to the gripper.

The first rollers and the gripper are provided to compress and to fuse the thermo-softening material onto a base structure.

The gripper provides support to the thermo-softening part, especially when the thermo-softening part is small. The gripper also prevents the thermo-softening part from slipping.

The gripper provides another means of supporting the thermo-softening material.

The application also provides a robotic structure for producing a thermo-softening part. The robotic structure includes an above-mentioned movable material placement apparatus, as well as a first arm unit with a second arm unit.

The movable material placement apparatus includes the above first placement unit and the above second placement unit.

The first arm unit has a first platform and a number of articulated interconnected first branch members, which are connected to the first platform and are connected to the first placement unit.

The first platform can be provided on the ground and can be movable.

The interconnected first branch members act to move the first placement unit to a first selected position in a three dimensional space, which comprises a length, a width, and a height.

Similarly, the second arm unit has a second platform and a number of articulated interconnected first branch members, which are connected to the second platform and are connected to the second placement unit.

The second platform can be provided on the ground and can be movable.

The articulated interconnected second branch members act to move the second placement unit to a second selected position in a three dimensional space.

Operationally, the second arm unit operates cooperatively with the first arm unit such that the second arm unit moves the second placement unit to move near the first placement unit.

The robotic arms provide a means to position the placement units to desired locations in three-dimensional space for forming a thermo-softening part.

The application also provides another robotic structure with magnetic coupling for forming a thermo-softening part.

The robotic structure includes the movable apparatus and an arm unit.

The movable apparatus comprises a first placement unit and a second placement unit, and a magnetic coupling device. The coupling acts for attracting the first placement unit to the second placement unit by a magnetic force.

The arm unit that comprises a platform and a plurality of articulated interconnected branch members. The plurality of articulated interconnected branch members is connected to the platform, and is connected to the first placement unit.

This robotic structure has an advantage in that it requires only one arm unit.

The application also provides a further apparatus for forming a thermo-softening part, wherein the apparatus is adapted for immersing in liquid.

The liquid provides a means to prevent the thermo-softening part from overheating.

The application also provides a method for forming a thermo-softening part.

The method includes a step of providing one or more first rollers and one or more second rollers on opposite sides of an elongated thermo-softening material, wherein these rollers are positioned near each other.

A pre-heating source can preheat the thermo-softening material to a predetermined preheating temperature for preparing the thermo-softening material for shaping or fusing.

A forming heating device later heats a portion of the thermo-softening material to a predetermined forming temperature.

A first robotic arm unit then moves the one or more first rollers in a first predetermined path and a second robotic arm unit moves the one more second rollers in a second predetermined path in order to compress the thermo-softening material portion.

The movement of the first rollers and the second rollers can later shape the thermo-softening material portion into a desired shape.

The movement of the first rollers and the second rollers can later also press and fuse the thermo-softening material portion onto a base structure, which is provided between the first rollers and the second rollers.

The thermo-softening material portion then cools naturally or cools by a cooling means for hardening it.

FIG. 1 illustrates a front view of a fiber placement apparatus with a base structure, FIG. 2 illustrates a front view of a fiber placement module of the fiber placement apparatus of FIG. 1, FIG. 3 illustrates a first position of the fiber placement apparatus of FIG. 1, FIG. 4 illustrates a second position of the fiber placement apparatus of FIG. 1, FIG. 5 illustrates a third position of the fiber placement apparatus of FIG. 1, FIG. 6 illustrates a schematic view of consolidation rollers of the fiber placement apparatus of FIG. 1, FIG. 7 illustrates an expanded view of the consolidation rollers of FIG. 6, FIG. 8 illustrates a flow chart of a method of operating the fiber placement apparatus of FIG. 1, FIG. 9 illustrates a further consolidation or shaping roller with a heat source for the fiber placement apparatus of FIG. 1, FIG. 10 illustrates a front view of a variant of the fiber placement apparatus of FIG. 1, which includes a magnetic clamping device, FIG. 11 illustrates a variant of the fiber placement apparatus of FIG. 1, which is adapted for submerging in liquid, FIG. 12 illustrates three sets of shaping rollers for the fiber placement apparatus of FIG. 1, FIG. 13 illustrates a straight path of the rollers of FIG. 12, FIG. 14 illustrates a curved path of the rollers of FIG. 12, FIG. 15 illustrates the rollers of FIG. 12 producing a tape with a convex upper surface, FIG. 16 illustrates the rollers of FIG. 12 producing a tape with a concave upper surface, FIG. 17 illustrates the fiber placement apparatus of FIG. 1 with one set of shaping rollers, FIG. 18 illustrates a perspective view of both ends of the shaping rollers of FIG. 17, wherein these ends have the same two radii, FIG. 19 illustrates a side view of the shaping rollers of FIG. 17, FIG. 20 illustrates a curved path of the rollers of FIG. 17, FIG. 21 illustrates a perspective view of a further set of shaping rollers, which is a variant of the shaping rollers of FIG. 6, each of these shaping rollers has two circular ends with different radii, FIG. 22 illustrates a side view of the shaping rollers of FIG. 21, FIG. 23 illustrates another perspective view of the further shaping rollers of FIG. 21, FIG. 24 illustrates another side view of the further shaping rollers of FIG. 21, FIG. 25 illustrates a method of using unidirectional thermoplastic tape for the fiber placement apparatus of FIG. 1, FIG. 26 illustrates a method of using a bundle of filaments for the fiber placement apparatus of FIG. 1, FIG. 27 illustrates a method of using a tape comprises thermoplastic material and spread roving for the fiber placement apparatus of FIG. 1, FIG. 28 illustrates another view of the method of FIG. 27, FIG. 29 illustrates the fiber placement apparatus of FIG. 1, wherein lower rollers are replaced with a gripper unit, FIG. 30 illustrates the fiber placement apparatus of FIG. 1, wherein the fiber placement apparatus includes two fiber tape placement units, wherein the second fiber tape placement unit is similar to the first fiber tape placement unit, FIG. 31 illustrates another view of the fiber placement apparatus of FIG. 30 with a base structure with a sandwich core material, FIG. 32 illustrates a front view of a hole of a base structure with several strips of tape, which provide a partial cover of the hole, and FIG. 33 illustrates a front view of the hole of FIG. 32 with several strips of tape, which provides a complete cover of the hole.

In the following description, details are provided to describe embodiments of the application. It shall be apparent to one skilled in the art, however, that the embodiments may be practiced without such details.

Some parts of the embodiment have similar parts. The similar parts may have the same names or similar part numbers with an alphabet symbol. The description of one similar part also applies by reference to another similar part, where appropriate, thereby reducing repetition of text without limiting the disclosure.

FIG. 1 shows a fiber placement apparatus 1 and a base structure 3.

The base structure 3 is made of one or more layers of composite material, such as thermoplastic material.

In a generic sense, the base structure 3 can constitute or include a thin sheet of material, such as plastic or metal. It can also include a sandwich core material, such as shown in FIG. 31.

The fiber placement apparatus 1 includes a robot 5 with a fiber placement module 6 and a computer 7. The fiber placement module 6 is attached to the robot 5.

The fiber placement module 6 acts as an end-effector of the robot 5.

The robot 5 includes a first articulated robotic arm 10 and a second articulated robotic arm 13.

The robotic arm 10 includes a movable platform 15 and a set of three interconnected arms 17.

The movable platform 15 is placed on a ground and is connected to the interconnected arms 17. The movable platform 15 is equipped with one or more wheels 16 or rollers, which is connected to a wheel actuator. The wheel actuator is electrically connected to the computer 7.

The interconnected arms 17 include a first arm 18, a second arm 19, and a third arm 20.

In detail, a first end of the first arm 18 is connected to the platform 15 via a first rotary joint. The first end of the first arm 18 and platform 15 are connected to a first actuator 21, which is connected electrically to the computer 7.

A second end of the first arm 18 is connected to a first end of the second arm 19 via a second rotary joint. The second end of the first arm 18 and the first end of second arm 19 are connected to a second actuator 23, which is connected electrically to the computer 7.

Similarly, a second end of the second arm 19 is connected to a first end of the third arm 20 via a third rotary joint. The second end of the second arm 19 and the first end of third arm 20 are connected to a third actuator 24, which is connected electrically to the computer 7.

A second end of the third arm 20 is attached to the fiber placement module 6.

The robotic arms 10 and 13 have similar parts, which are connected in the similar manner.

The robotic arm 13 includes a movable platform 15a and a set of three interconnected arms 17a. The interconnected arms 17a include a first arm 18a, a second arm 19a, and a third arm 20a.

The fiber placement module 6 includes an upper fiber tape placement unit 22 and a lower fiber tape placement unit 25.

The upper fiber tape placement unit 22 is connected to the robotic arm 10. The lower fiber tape placement unit 25 is connected to the robotic arm 13.

Referring to the upper fiber tape placement unit 22, it includes a supporting frame 31, a reel 33 with a length of tape 43, a set of two cylindrical compaction rollers 35, a heat source 37, a cooling device 39, and a temperature sensor 41, as shown in FIGS. 2 and 6. The upper fiber tape placement unit 22 also includes a pre-heating source 26, a post-heating source 27, and a tape inspection device 28, as shown in FIG. 2.

Referring to FIGS. 1 and 2, the supporting frame 31 is mounted to the third arm 20 of the first robotic arm 10. The supporting frame 31 is also connected to the tape reel 33, the compacting rollers 35, the heat source 37, the cooling device 39, and the temperature sensor 41.

The tape reel 33 is positioned near the compaction rollers 35.

The two compaction rollers 35 are arranged next to each other such that surfaces of the respective cylindrical rollers 35 face each other while ends of the respective roller 35 are placed adjacent to each other. Each of the rollers 35 can rotate about a longitudinal axis of the roller 35. Each of the compaction rollers 35 is also connected to a positional actuator 45, which is connected electrically to the computer 7.

The heat source 37 has a laser generation unit 38. As better seen in FIG. 2, the heat source 37 is positioned near the tape reel 33 such that the laser generation unit 38 is directed at a point or an area where a part of the tape 43 is placed near to the upper surface of the base structure 3, wherein the tape 43 is about to meet the upper surface of the base structure 3. The heat source 37 is electrically connected to the computer 7.

The cooling device 39 is placed adjacent to the compaction rollers 35 and is directed to an area of the upper surface of the base structure 3. The cooling device 39 is electrically connected to the computer 7.

The pre-heating source 26 is placed near the heat source 37 and is electrically connected to the computer 7.

The post-heating source 27 is electrically connected to the computer 7.

The tape inspection device 28 is electrically connected to the computer 7.

The temperature sensor 41 is electrically connected to the computer 7.

Referring to the lower fiber tape placement unit 25, it includes a supporting frame 50 and a set of two cylindrical counter compaction rollers 53, which are attached to the supporting frame 50.

The compaction rollers 35 and the counter compaction roller 53 are also called consolidation or shaping rollers.

The supporting frame 50 is mounted to the third arm 20a of the second robotic arm 13.

The two counter compaction rollers 53 are placed next to each other such that surfaces of the respective cylindrical rollers 53 face each other while ends of the respective roller 53 are placed adjacent to each other. Each of the rollers 53 can rotate about a longitudinal axis of the roller 53. Each of the rollers 53 is also connected to a positional actuator 55, which is connected electrically to the computer 7.

The tape 43 comprises a thermoplastic composite material or thermoplastic material. The thermoplastic composite material becomes pliable or moldable above a predetermined temperature and solidifies or hardens upon cooling.

In use, the first robotic arm 10 and the second robotic arm 13 are positioned such that the counter compaction rollers 53 and the compaction rollers 35 are placed at opposite sides of the base structure 3. The counter compaction rollers 53 are placed near the compaction rollers 35 such that the compaction rollers 35 touch the upper surface of the base structure 3 and the counter compaction rollers 53 touch the lower surface of the base structure 3.

The set of interconnected arms 17 together with the movable platform 15 is intended for moving the upper fiber tape placement unit 22 to a selected position in a three dimensional space, according to instructions from the computer 7. The three dimensional space comprise a length, a width, and a height and is thus different from a plane, which refers to a two dimensional space. In other words, the upper fiber tape placement unit 22 can placed at several positions, as illustrated in FIGS. 3, 4, and 5.

In detail, the movable platform 15, upon activation by the computer 7, moves in the horizontal plane to a desired position. In particular, the computer 7 activates the wheel actuator, which rotates the wheels 16 of the platform 15 to move the platform 15. The moving platform 15, in turn, moves the set of interconnected arms 17.

The computer 7 act to activate the first actuator 21 to rotate the first arm 18 with respect to the platform 15 about the first rotary joint that connects the first arm 18 to the platform 15.

The computer 7 also acts to activate the second actuator 23 to rotate the second arm 19 with respect to the first arm 18 about the second rotary joint that connects the first arm 18 to the second arm 19.

The computer 7 also acts to activate the third actuator 24 to rotate the third arm 20 with respect to the second arm 19 about the third rotary joint that connects the second arm 19 to the third arm 20.

Together, the first, the second and the third actuators serve to move the upper fiber tape placement unit 22 to the selected position.

Similarly, the set of interconnected arms 17a together with the movable platform 15a is intended for moving the lower fiber tape placement unit 25 to a selected position in a three dimensional space.

The tape reel 33 acts to hold the tape 43 and to release the tape 43 when needed.

The pre-heating source 26 acts to preheat a tape part and a upper surface area of the base structure 3 to a predetermined temperature, as shown in FIG. 2. The preheating prepares the tape part for further heating by the laser generation unit 38. The pre-heating source 26 is activated by the computer 7.

The temperature sensor 41 is intended for measuring temperature of the base structure 3 and the tape 43. The temperature sensor 41 then sends the measurement to the computer 7.

The laser generation unit 38 is activated by the computer 7. The laser generation unit 38 can provide a laser beam with different radiation operating parameters, such as shape or profile, size, and intensity, as shown in FIGS. 6 and 7.

The laser generation unit 38 can also be moved such that the direction of the laser beam can be changed according to application of the laser generation unit 38.

The adjustment of the radiation device operating parameters provides an advantage for allowing optimization or improvement of the tape fusion or shaping process.

For shaping, the laser generation unit 38 provides heat to a part of the tape 43 to a predetermined forming temperature. In effect, the tape portion is heated such that it softens.

The compaction rollers 35 and the counter compaction roller 53 serve as consolidation rollers. The compaction rollers 35 and the counter compaction roller 53 work together cooperatively for pressing and gripping the tape 43.

In detail, the positional actuator 45 pushes the compaction roller 35 and the positional actuator 55 pushes the corresponding counter compaction roller 53 until the compaction roller 35 and the corresponding counter compaction roller 53 compresses and grips a portion of the tape 43

The first robotic arm 10 and the second robotic arm 13 then move the compaction roller 35 and corresponding counter compaction roller 53, which in turn moves the gripped tape portion for shaping the tape 43.

The cooling device 39 then cools the shaped tape 43 to harden it. The cooling device 39 is activated by the computer 7.

For fusing, the tape 43 is placed on the upper surface of the base structure 3 and is placed near the laser generation unit 38.

The laser generation unit 38 provides heat to a part of the tape 43 and also to an area of the upper surface of the base structure 3, wherein these parts are placed near to each other. These parts are heated to a predetermined fusing temperature. At this temperature, the tape portion and the base structure area have a viscous outer layer for fusing.

The compaction rollers 35 and the counter compaction roller 53 then press the tape portion towards the upper surface area. The pressing also drives out any entrapped air and suppresses bubble formation between the pressed tape portion and the pressed upper surface area. The pressing also fuses or joins the tape portion to the upper surface area.

The cooling device 39 later cools the fused part to harden it.

The post-heating source 27 acts to relieve any mechanical stress and warpage in the fused portion. If the fused portion cools rapidly, it can develop internal mechanical stress. The post-heating source 27 acts to re-heat the two or more fused layers to reduce internal stress. This step is often done independently from the tape fusing step.

The inspection device 28 uses thermal images to monitor build quality for ensuring quality of the finished part. The inspection device 28 also provides real time process information, which acts as process documents.

In one embodiment, the cooling device includes a coolant and regulates a flow rate of the coolant for reducing the temperature of the tape portion or temperature of the newly fused thermoplastic portion, according to temperature measurement by the sensor 41. The flow rate is increased or decreased such that the tape temperature reaches a desired temperature reading.

In another embodiment, the heat source 37 includes other heating units for transferring heat via conduction, convection, and/or radiation to the tape 43 and to the base structure 3. The convection can be done using gas torches. A combination of one or more of conduction, convection, and radiation can also be used for heating.

In a further embodiment, the compaction rollers 35 and the counter compaction rollers 53 include heating devices 36 for enabling the compaction rollers 35 and the counter compaction rollers 53 to provide heat energy to the tape 43 and to the base structure 3, as shown in FIG. 9.

These heating devices 36 provide one method of the heating the tape 43. Other means for heating the tape 43 are possible.

In a further embodiment, the base structure 3 comprises other material, instead of thermoplastic material. Examples of the other material include metal, plastic, or ceramic.

In a general sense, the cooling device 39 can include a passive cooling device, such as a heat sink.

The inspection device 28 can also use other modules for monitor build quality. Those modules can include a vision camera or an ultrasonic device.

The inspection device 28 can also include a tape-laying odometer for measuring a length of the shaped or fused thermoplastic tape.

The robotic arm 10 and 13 can each include various numbers of interconnect arms. They can each include two or more interconnected arms, instead of just three arms.

The platforms 15 and 15*a* can be bolted or fixed to the ground, wall, or ceiling instead of being movable. In other words, the robotic arm 10 and 13 can be placed on a linear axis or pole to extend their reach. They can also be bolted to the ground.

Different methods of operating the fiber placement apparatus 1 to manufacture or produce thermoplastic parts are possible.

FIG. 8 shows a flow chart 60 of one method of operating the fiber placement apparatus 1 to manufacture thermoplastic parts as described below.

The flow chart 60 comprises a preparation mode 62, a shaping mode 64, and a fusing mode 66.

In the preparation mode 62, it includes a step 70 of the first robotic arm 10 positioning the compaction rollers 35 on one side of the tape 43 and the second robotic arm 13 positioning the counter compaction rollers 53 on another side of the tape 43. The compaction rollers 35 are positioned near to the counter compaction rollers 53.

The pre-heating source 26 then provides heat energy to preheat the tape 43 to a predetermined preheating temperature for preparing the tape 43 for shaping or fusing, in a step 72.

In the shaping mode 64, the fiber placement apparatus 1 is used for shaping the tape 43 to act as a base structure.

The laser generation unit 38 later produces a laser beam to heat a portion of the preheated tape 43 to a predetermined forming temperature, in a step 73.

The positional actuators 45 and the positional actuators 55 afterward move the compaction rollers 35 and the counter compaction rollers 53 to touch and to compress the heated tape 43, in a step 75.

The compression also acts to grip the tape 43, thus allowing the compaction rollers 35 together with the counter compaction rollers 53 to move the compressed or gripped portion of the tape 43.

Subsequently, the first robotic arm 10 and the second robotic arm 13 moves the compaction rollers 35 and the counter compaction rollers 53, which are compressing and gripping the heated tape 43, in order to shape the heated tape 43.

The movement of the rollers 35 and 53 and the compression of the rollers 35 and 53 can operate together to cause a portion of the tape 43 to move to another position thereby shaping the heating tape 43.

The temperature sensor 41 later measures the temperature of the tape 43 and sends the measured temperature to the computer 7, which uses the measured temperature for regulating the cooling device 39, in a step 77.

The cooling device 39 afterward cools the shaped tape portion for hardening the shaped tape portion to form a desired thermoplastic part with the desired shape or geometry, in a step 80.

In the fusing mode 66, the fiber placement apparatus 1 is used for fusing the tape 43 with the base structure 3 to lay one or more layers of the tape 43 onto the base structure 3.

The fusing mode includes a step 82 of the first robotic arm 10 positioning the compaction rollers 35 and the second robotic arm 13 positioning the counter compaction rollers 53 on opposite sides of the base structure 3. The tape 43 is also placed between the compaction rollers 35 and the counter compaction rollers 53.

The laser generation unit 38 later produces a laser beam to heat a part of the preheated tape 43 and a portion of the preheated upper surface of the base structure 3 to a predetermined fusing temperature, in a step 84. The heated portion of the tape 43 may have an outer surface that is in a viscous state.

The positional actuators 45 and the positional actuators 55 afterward move the compaction rollers 35 and the counter compaction rollers 53 to press the heated tape part to the heated surface portion of the base structure 3 in order to fuse together these two parts, thereby forming a newly bonded structure, in a step 87.

The temperature sensor 41 later measures the temperature of the newly bonded structure and sends the measured temperature to the computer 7 for regulating the cooling device 39, in a step 89.

The post-heating source 28 then provides heat to the newly bonded structure to eliminate or reduce any warpage or internal mechanism stress due to rapid cooling.

The cooling device 39 afterward cools the newly bonded structure for hardening the tape 43 and the base structure 3, which have been fused together, in a step 91.

The above steps can be repeated to provide the base structure 3 with more layers of the tape 43 to manufacture the finished thermoplastic part.

In one embodiment, the method includes a first stage and a second stage of a manufacturing process.

In the first stage, the shaping mode is used to form a base structure that comprises a first layer of material.

In the second stage, the base structure is reinforced according to design and load carrying elements.

Different heat transfer sources, different amount of compaction force, and different material placements can be used for the different stages. For instance, methods that are easier to shape in free space may be used for the base structure in the first stage, while methods that result in higher performance,—for example, through higher percentage of fiber content—may be used for subsequent second stages.

In another embodiment, the base layer consists of a compatible material, such as organic sheets with a compatible thermoplastic matrix, which has been pre-formed by another process.

In general, the heated tape 43 is often cooled and hardened using natural means, without use of the cooling device 39. In other words, the cooling device 39 is not needed to cool the heated tape 43. This happens when the laser beam is moving and is not focused on one spot. When the speed of laying the tape 43 onto the base structure 3 is increased, the cooling device 39 may be used.

56tfv

This method to produce the thermoplastic part provides several benefits.

One fiber placement apparatus 1 can be used for producing various different finished parts. This fiber placement apparatus 1 differs from customised tools, wherein one customised tool is required for each finished part.

The fiber placement apparatus 1 allows reduction of production set-up time, as customised tooling, which takes time to produce, is not needed.

The fiber placement apparatus 1 also reduces production cost, since no cost is incurred for producing the customised tools. Moreover, no cost is incurred for waiting for delivery of the customised tools. Use of the fiber placement apparatus 1 also removes risk related to production of the customised tool.

The fiber placement apparatus 1 can also be used to produce small and large parts. This, in turn, causes part supply chain to be flexible, since production of normal and urgent parts can be handled together by the same apparatus.

Moreover, the fiber placement apparatus 1 allows production of parts with little scrap and minimal trimming.

The fiber placement apparatus 1 also permits a high degree of automation and allows non-stop production, thereby improving usage of equipment and facilities.

This highly automated process also leads to higher quality improvements, since manual work is reduced.

FIG. 10 shows a further fiber placement apparatus 1a. The fiber placement apparatus 1a and the fiber placement apparatus 1 of FIG. 1 have similar parts.

The fiber placement apparatus 1a includes a fiber placement module 6 and a magnetic clamping device 67. The fiber placement module 6 includes an upper fiber tape placement unit 22 and a lower fiber tape placement unit 25.

In use, the upper fiber tape placement unit 22 and the lower fiber tape placement unit 25 are placed on opposite sides of a base structure.

The upper fiber tape placement unit 22 is connected to a robotic arm 10, wherein the robotic arm 10 acts for positioning the upper fiber tape placement unit 22.

The magnetic clamping device 67 provides a magnetic force that acts to attract the upper fiber tape placement unit 22 to the lower fiber tape placement unit 25.

One method of operating the fiber placement apparatus 1a is described below.

The method includes a step of placing the upper fiber tape placement unit 22 next to an upper surface of the base structure.

The lower fiber tape placement unit 25 is then placed next to a lower surface of the base structure, which is near the upper fiber tape placement unit 22.

The magnetic clamping device 67 later acts to attract the lower fiber tape placement unit 25 to the upper fiber tape placement unit 22.

The robotic arm 10 afterward moves the upper fiber tape placement unit 22 from one area of the upper surface to another area of the upper surface of the base structure.

The magnetic force of the magnetic clamping device 67 later acts to move the lower fiber tape placement unit 25 accordingly such that the lower fiber tape placement unit 25 is placed near the upper fiber tape placement unit 22.

This allows compaction rollers of the upper fiber tape placement unit 22 and counter compaction rollers of the lower fiber tape placement unit 25 to compress a thermoplastic tape onto the base structure.

FIG. 11 shows a fiber placement apparatus 1b. The fiber placement apparatus 1b and the fiber placement apparatus 1 of FIG. 1 have similar parts.

The parts of the fiber placement apparatus 1b are configured or adapted for operating in liquid.

The liquid can refer to deionized water, wherein electrically charged atoms or molecules are removed from the water.

The fiber placement apparatus 1b has several advantages.

The deionized water provides higher heat transfer rate than air, resulting in accelerated cooling of heated thermoplastic materials. This accelerated cooling allows a newly bonded thermoplastic structure to cool faster, thereby increasing operational efficiency of the fiber placement process and the manufacturing time of part produced by the fiber placement apparatus 1b.

In addition, the deionized water is electrically neutral and has more buoyancy than air. This will reduce stresses on the newly bonded thermoplastic structure after fusion.

In a generic sense, other fiber placement apparatus can be provided for operating in liquid in order to have the above benefits.

In a general sense, the fiber placement apparatus 1 can have different numbers of rollers, as illustrated in FIGS. 12 and 17.

Referring to FIG. 12, it shows three set of shaping rollers for fiber placement apparatus 1. Each set of shaping rollers comprises a compaction roller and a counter compaction roller.

In use, the rollers can move in different paths for shaping a tape.

These rollers can move in a straight path, as shown in FIG. 13. These rollers can also move in a curved path for shaping a tape, as shown in FIG. 14.

Each of the three rollers can be also positioned differently for providing the tape with different shapes.

The rollers can be positioned to provide the tape with a convex upper surface, as shown in FIG. 15.

The rollers can be positioned to provide the tape with a concave upper surface, as shown in FIG. 16.

Referring to FIG. 17, it shows the fiber placement apparatus of FIG. 1 with just one set of shaping rollers.

The shaping rollers have two circular ends that have the same radius, shown in FIGS. 18 and 19.

When the roller rotates, both ends of the roller turn at the same rotational speed. This allows these rollers to move easily in a straight path or a curved path, as shown in FIG. 20.

FIGS. 14 and 20 also show a method of steering a tape vertically upwards and downwards.

Different shapes of the shaping rollers are possible.

FIGS. 21 to 24 show a variant of the shaping rollers of FIG. 6. FIGS. 21 to 24 show a further set of shaping rollers.

The further set of shaping rollers includes two rollers 35a and 53a. Each of the rollers 35a and 53a has a shape of a truncated cone. In other words, each of the rollers 35a and 53a has two circular ends with different radii.

The rollers 35a and 53a are arranged such that the smaller end of the roller 35a is placed next to the smaller end of the roller 53a. Similarly, the larger end of the roller 35a is placed next to the larger end of the roller 53a.

In use, the rollers 35a and 53a compress and grip the tape 43.

The tape 43 has a first edge, which is nearer to the smaller ends of the rollers 35a and 53a. The tape 43 has a second edge, which is nearer to the larger ends of the rollers 35a and 53a.

When these rollers 35a and 53a turn at the same rotational speed, the first edge travels slower than the second edge. This causes the tape 43 to turn towards the smaller ends of the rollers 35a and 53a, as shown in FIGS. 21 and 23.

These rollers 35a and 53a have a benefit of producing a tape with a curvature.

In general, the FIG. 18 with the FIG. 19, the FIG. 21 with the FIG. 22, and the FIG. 23 with the FIG. 24 depict rollers with different shapes. The FIGS. 18 and 19 show rollers with cylindrical shapes while the FIGS. 21 and 22 and the FIGS. 23 and 24 show rollers with conical shapes.

Different methods of placing fibers and matrix material into a usable compound for the fiber placement apparatus 1 of FIG. 1 are possible.

In one implementation, fiber reinforced filaments of a "fused deposition molding" (FDM) process can be used. In another implementation "co-mingled yarn"—thermoplastic coated fibers—are used.

Figure 25:
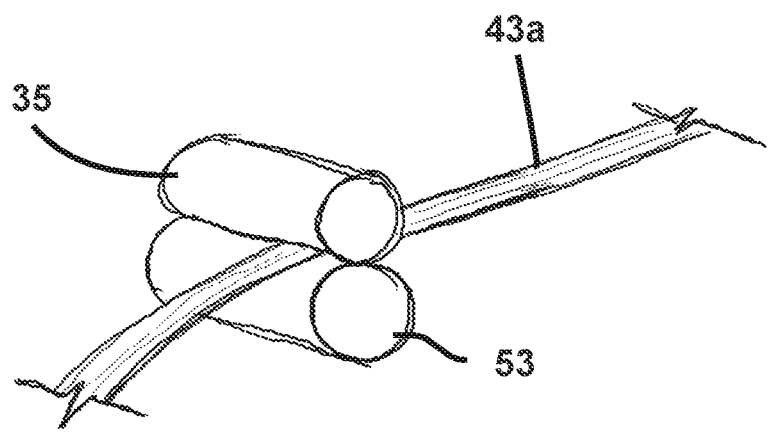
FIG. 25 shows a method that is using unidirectional fiber thermoplastic tape 43a and heating the tape for processing.
Figure 26:
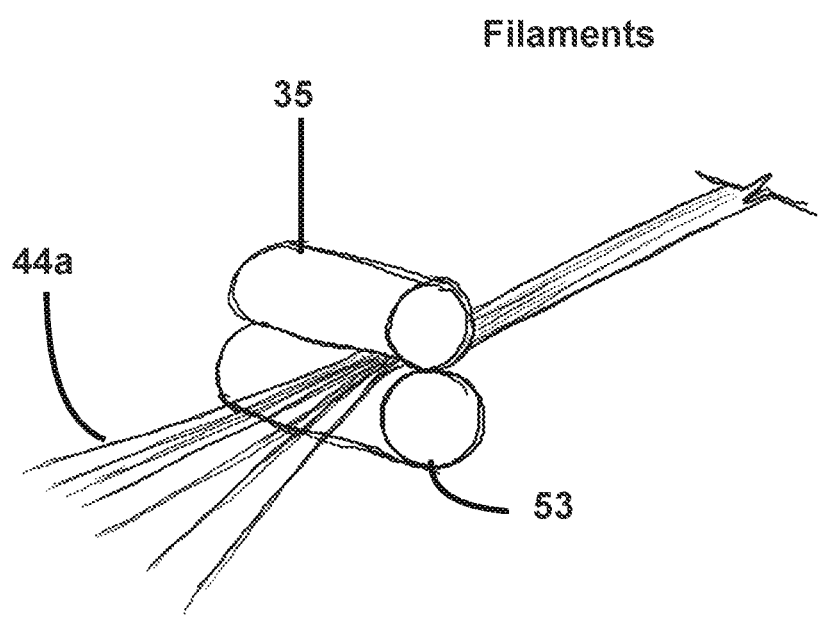
FIG. 26 shows a method of using filaments or fiber strands 44a that are combined in the process itself. This therefore allows variations of the resulting tape structure width and thickness.
Figure 27:
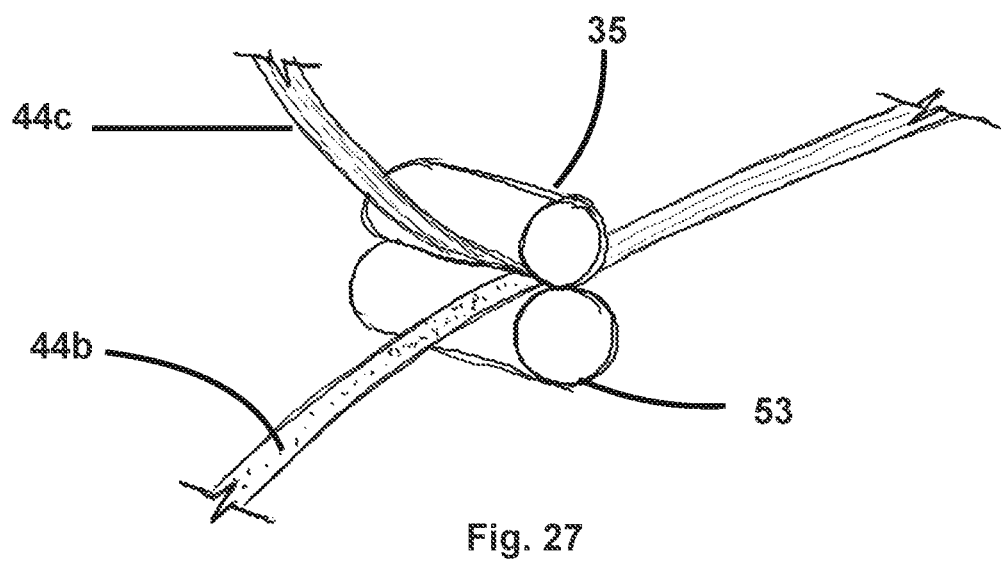
Figure 28:
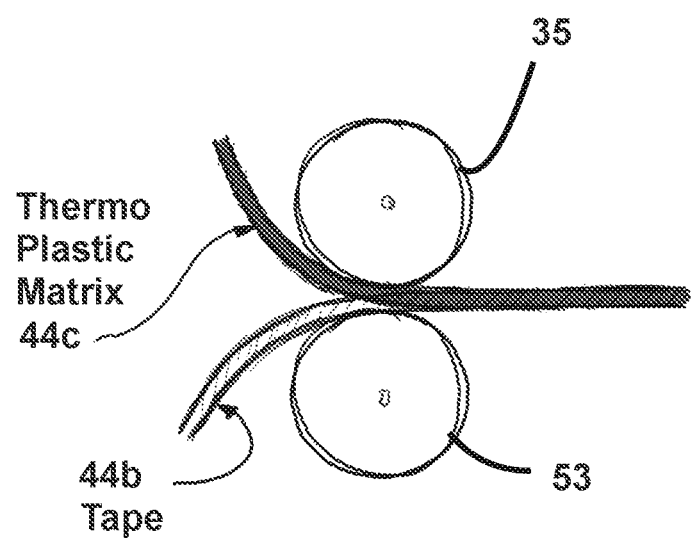

FIGS. 27 and 28 show another method that includes adding thermoplastic material 44b, either liquid, as droplets, powder, film or any other shape to add to other forms of placement, for example, those methods described in FIGS. 25 and 26.

In one implementation, the "tape" could also be a dry, spread roving 44c, therefore only fibers.

The fiber placement apparatus 1 can be provided with different types of end-effectors.

Figure 1:
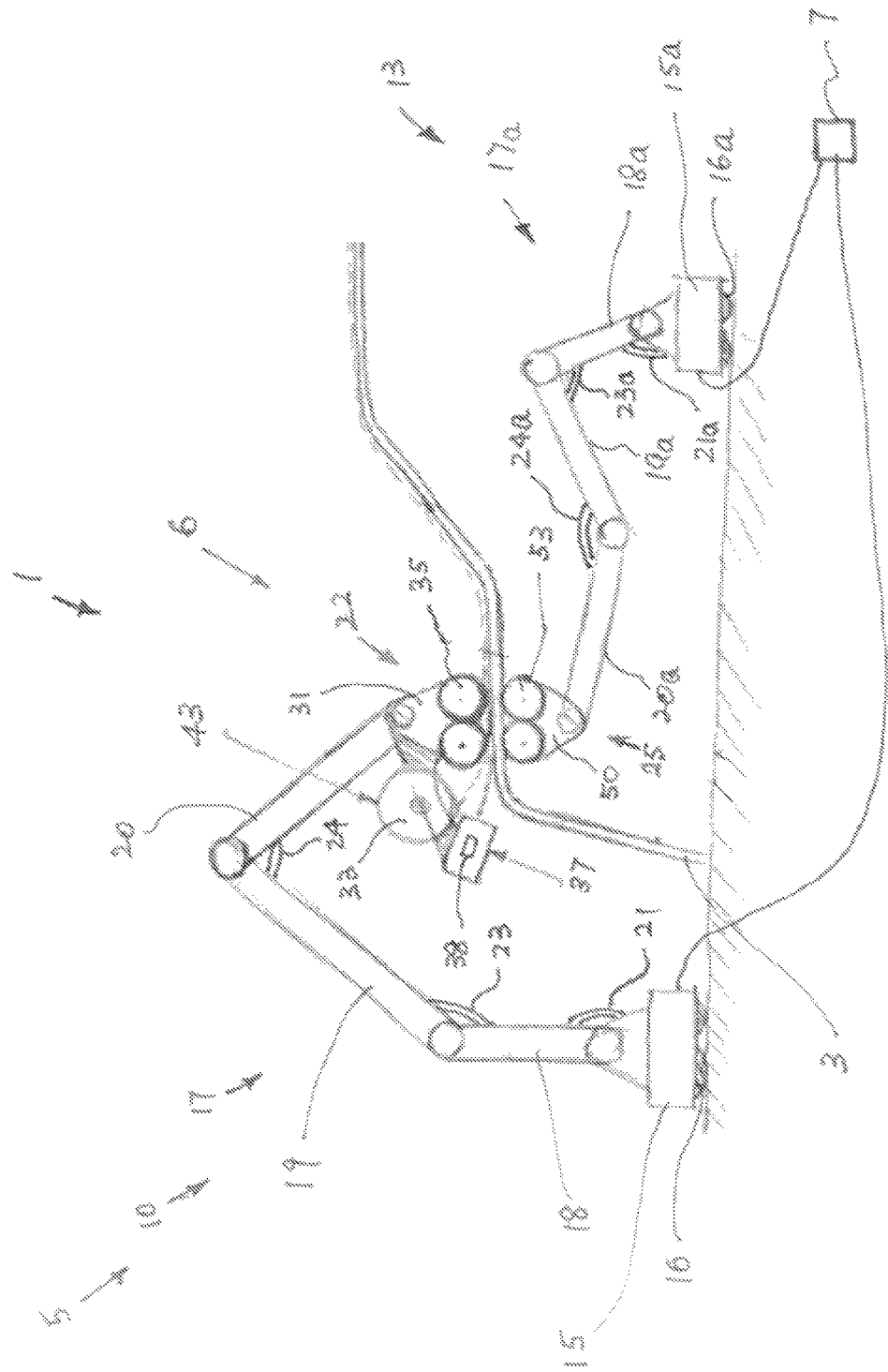
Figure 2:
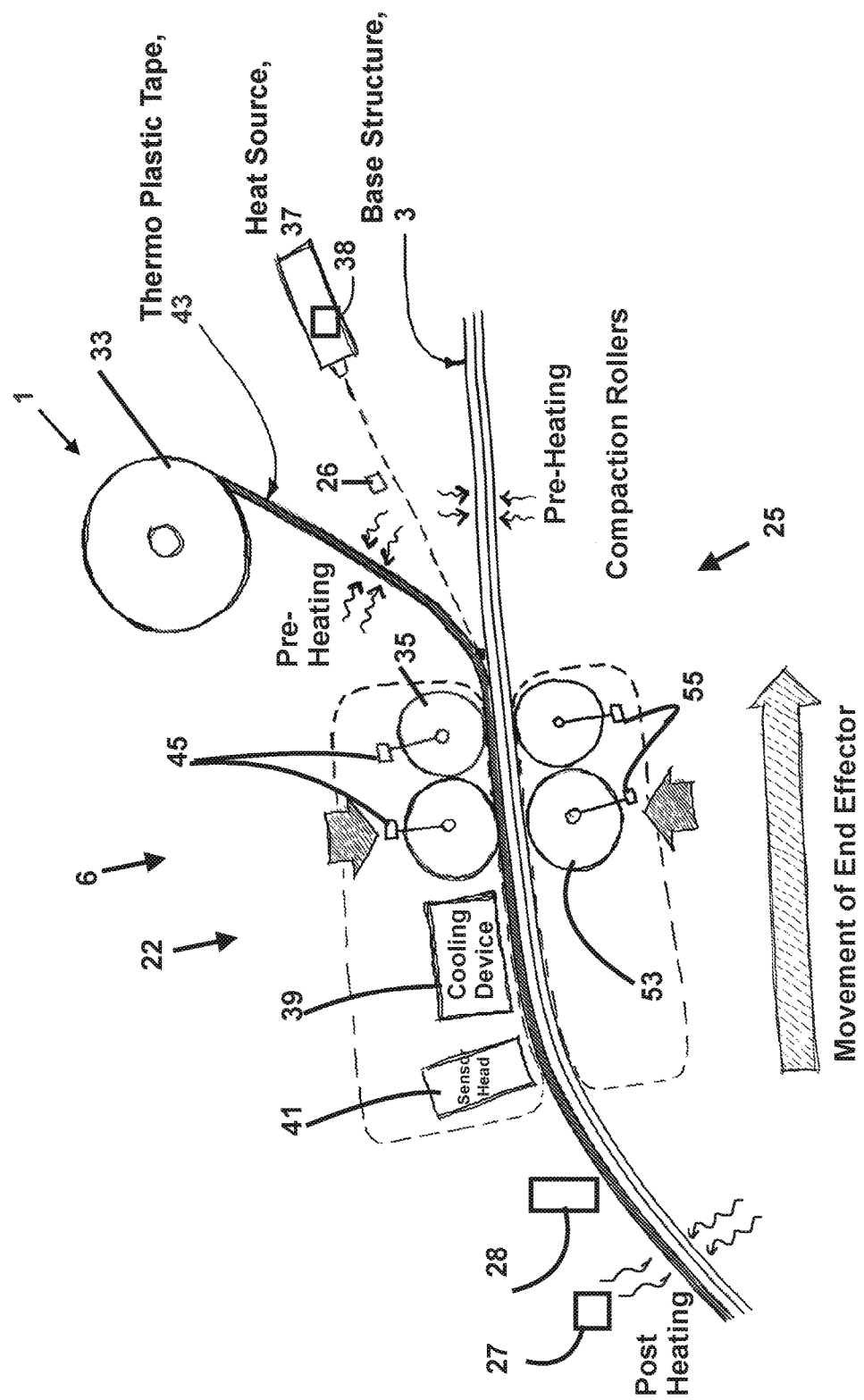
Figure 3:
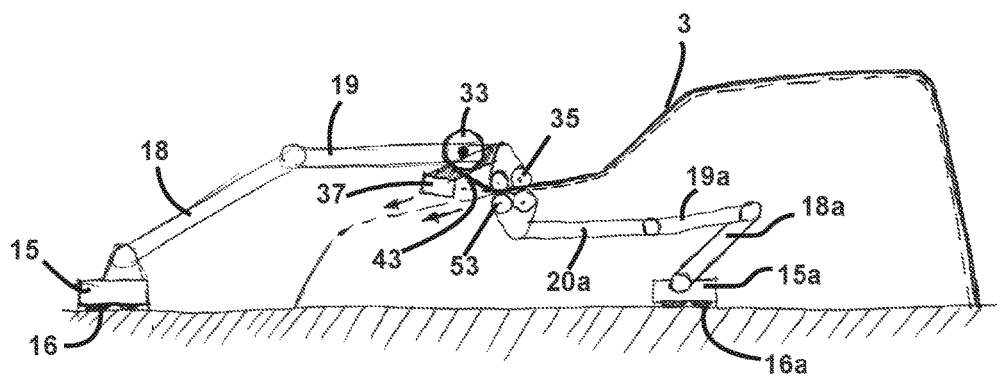
Figure 4:
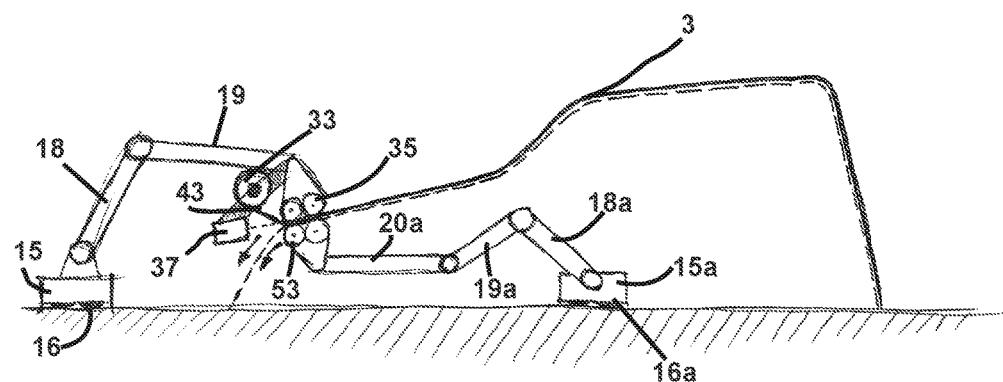
Figure 5:
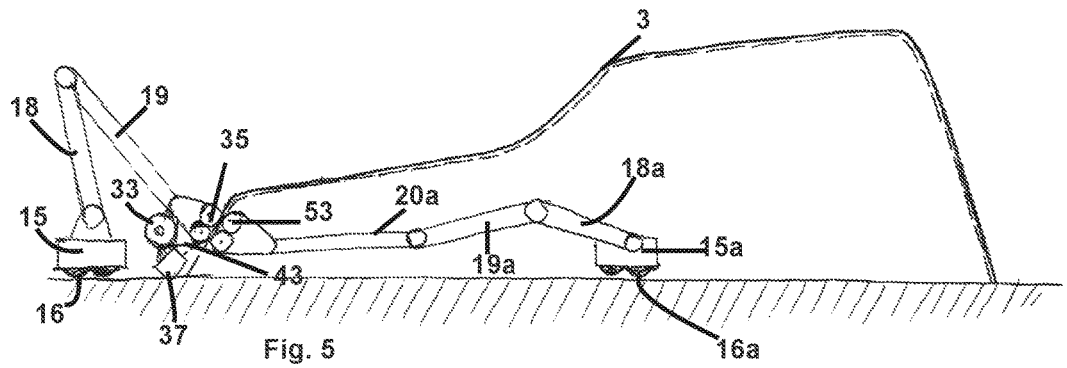
Figure 8:
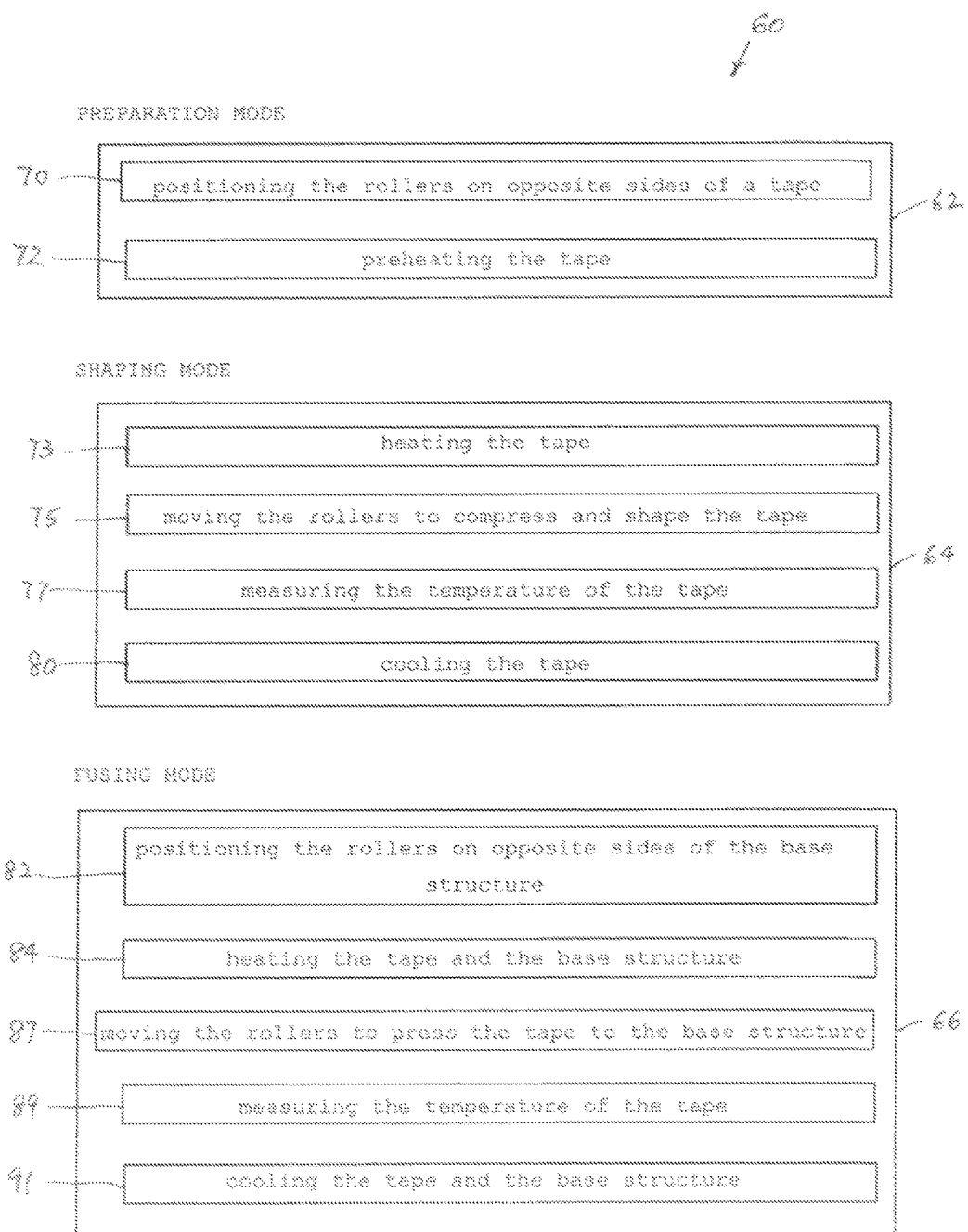
Figure 9:
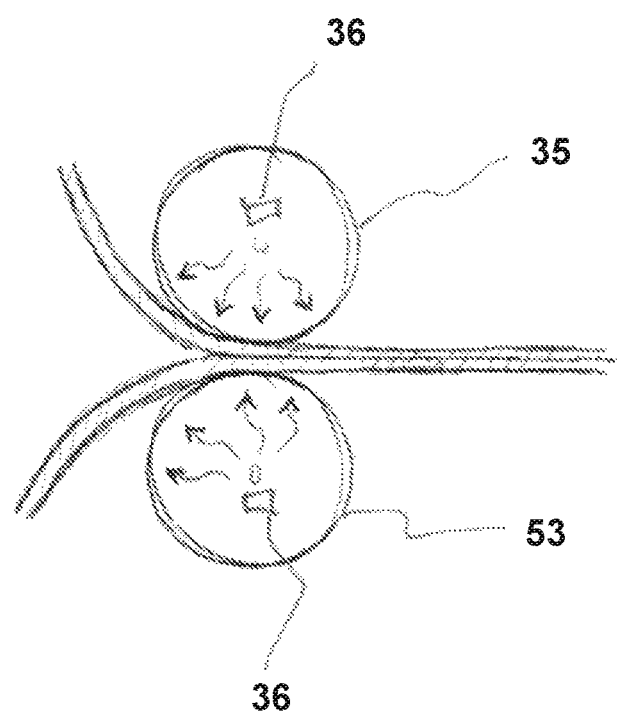
Figure 10:
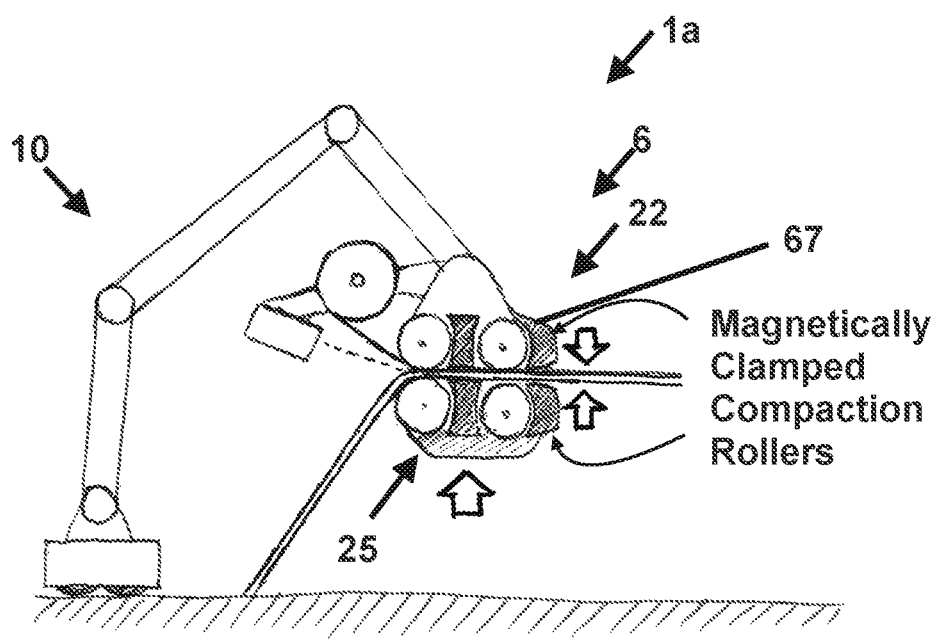
Figure 11:
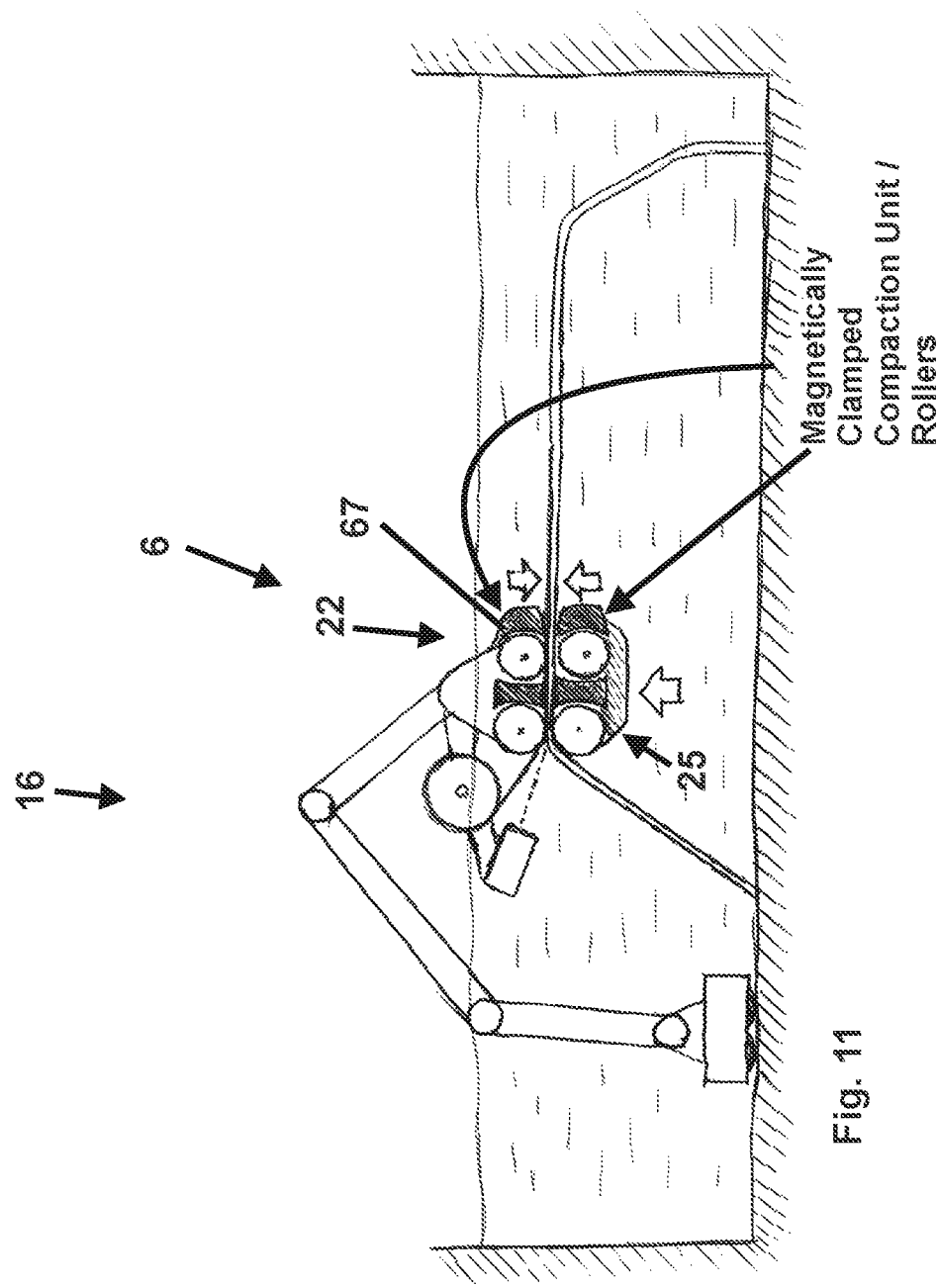
Figure 12:
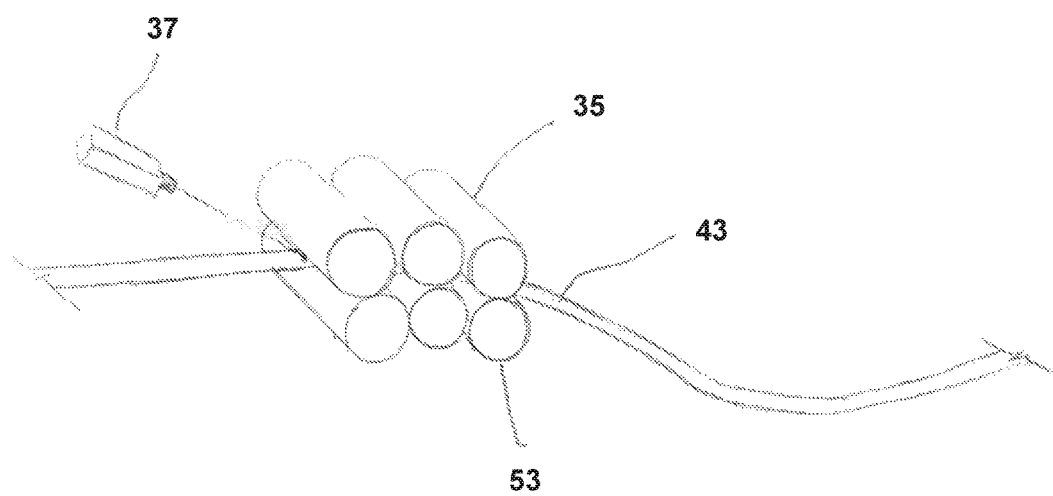
Figure 13:
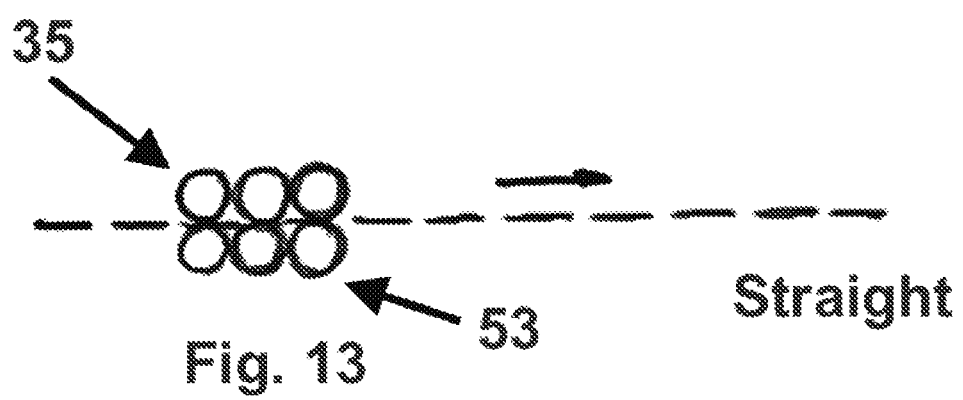
Figure 14:
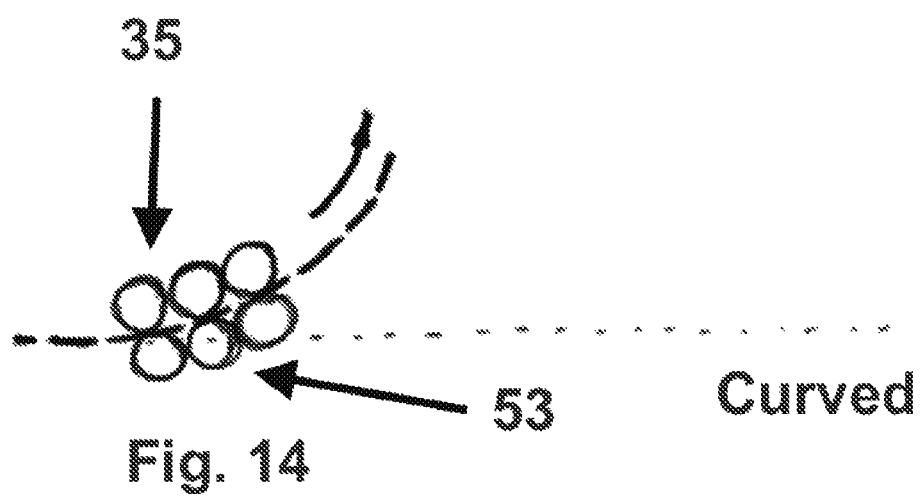
Figure 15:
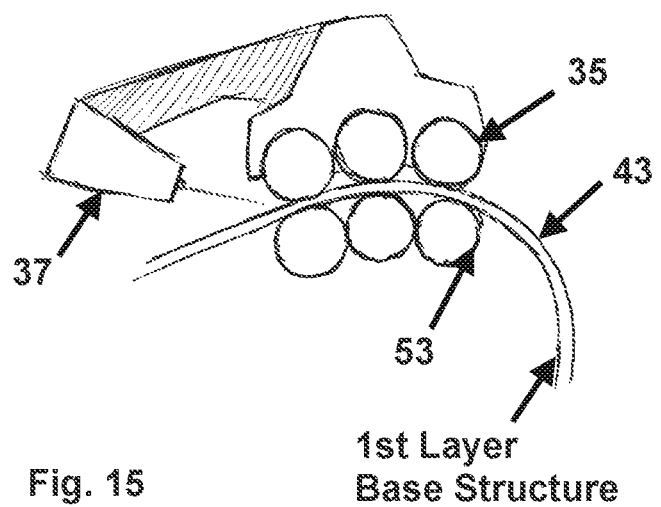
Figure 16:
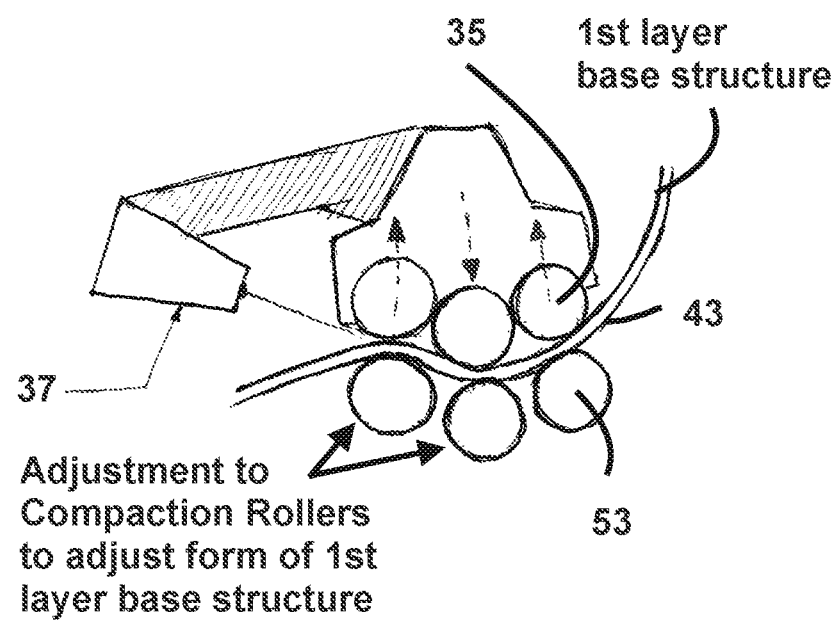
Figure 17:
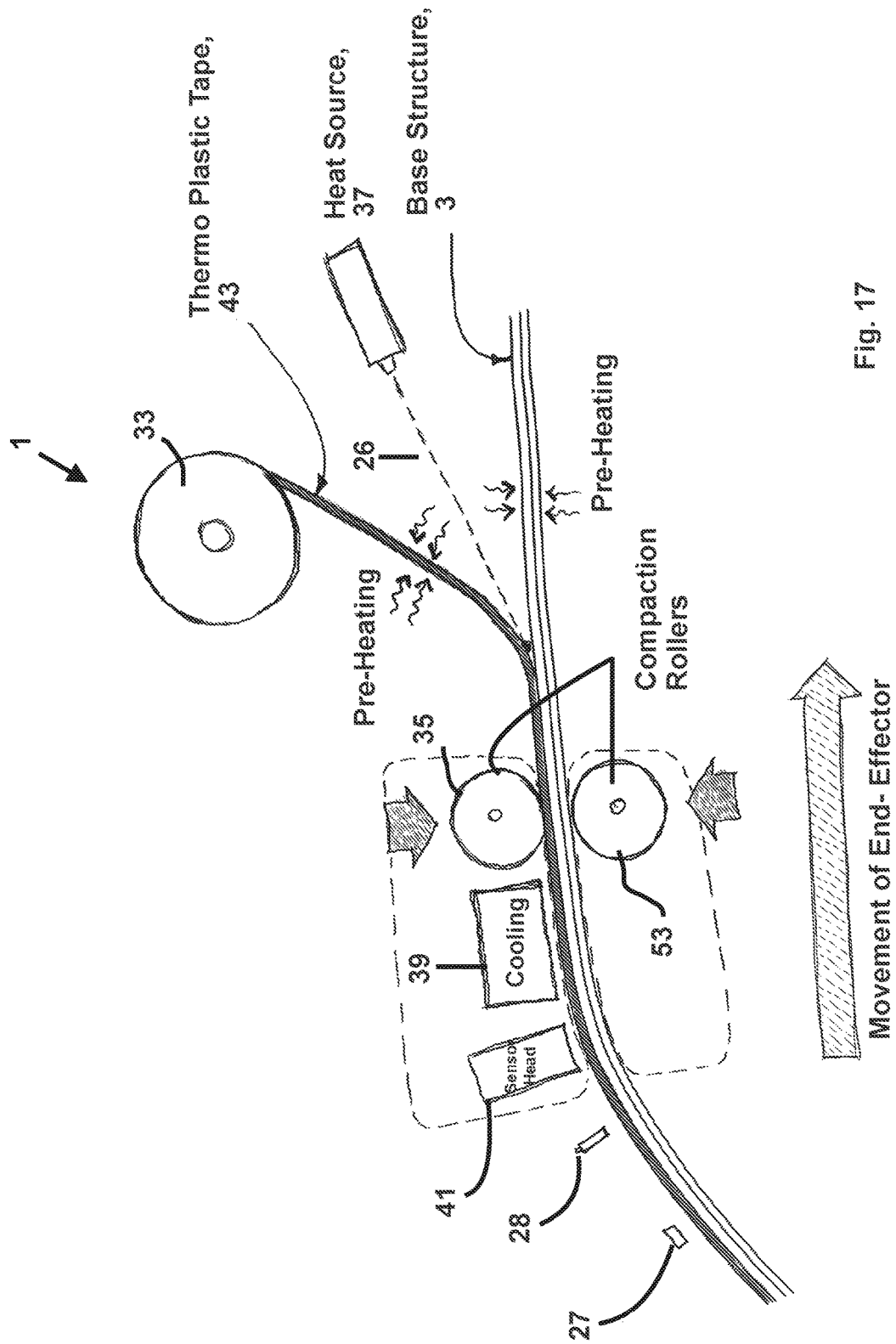
Figure 20:
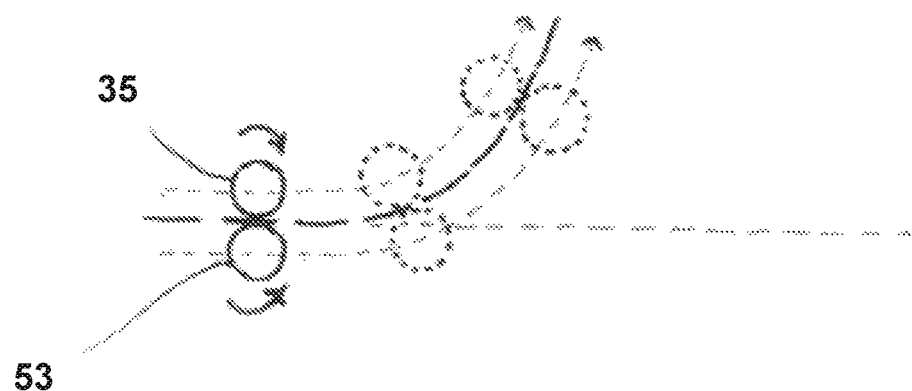
Figure 21:
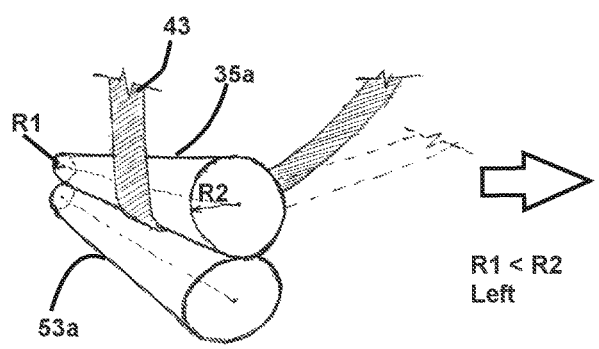
Figure 22:
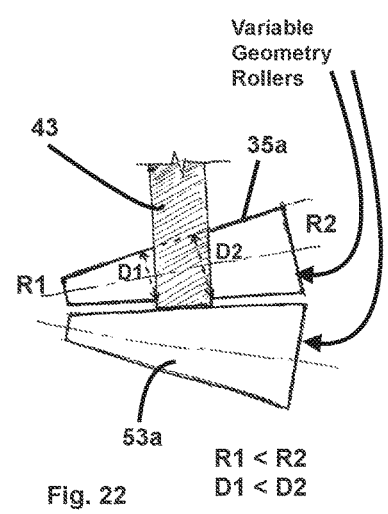
Figure 29:
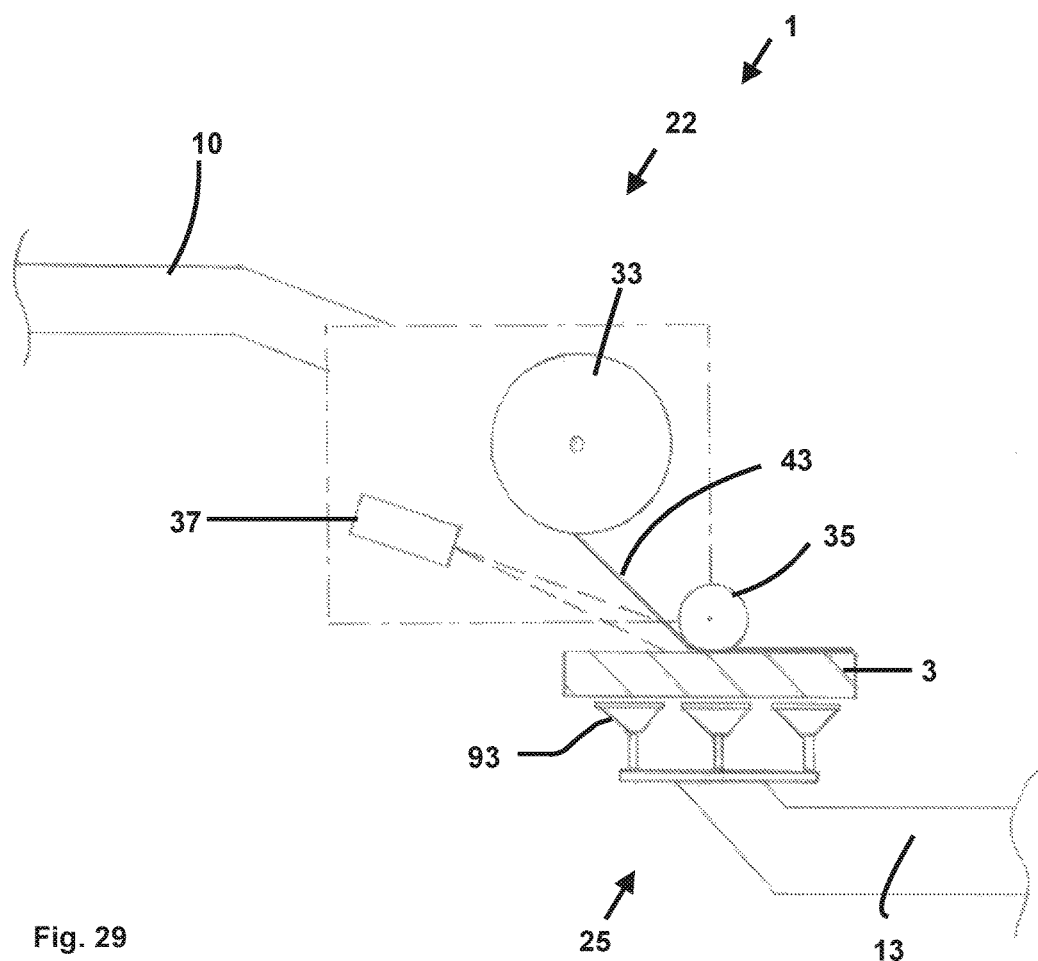

FIG. 29 shows the fiber placement apparatus 1 of FIG. 1, wherein the counter compaction rollers 53 of the lower fiber tape placement unit 25 are replaced by a gripper unit 93. The gripper unit is attached to the robotic arm 13.

In use, the robotic arm 13 moves the gripper unit 93 to a desired position for supporting a base structure 3, especially during consolidation of a tape or during fusing of a tape onto the base structure 3.

The gripper 93 acts to absorb compacting forces from the compaction rollers 35 during the consolidation or the fusing.

The gripper 93 also prevents the base structure 3 for slipping or from moving perpendicularly to the movement of the compaction rollers 35.

The gripper 93 is used especially for small base structure where counter compaction rollers are too big for supporting the base structure.

Figure 30:
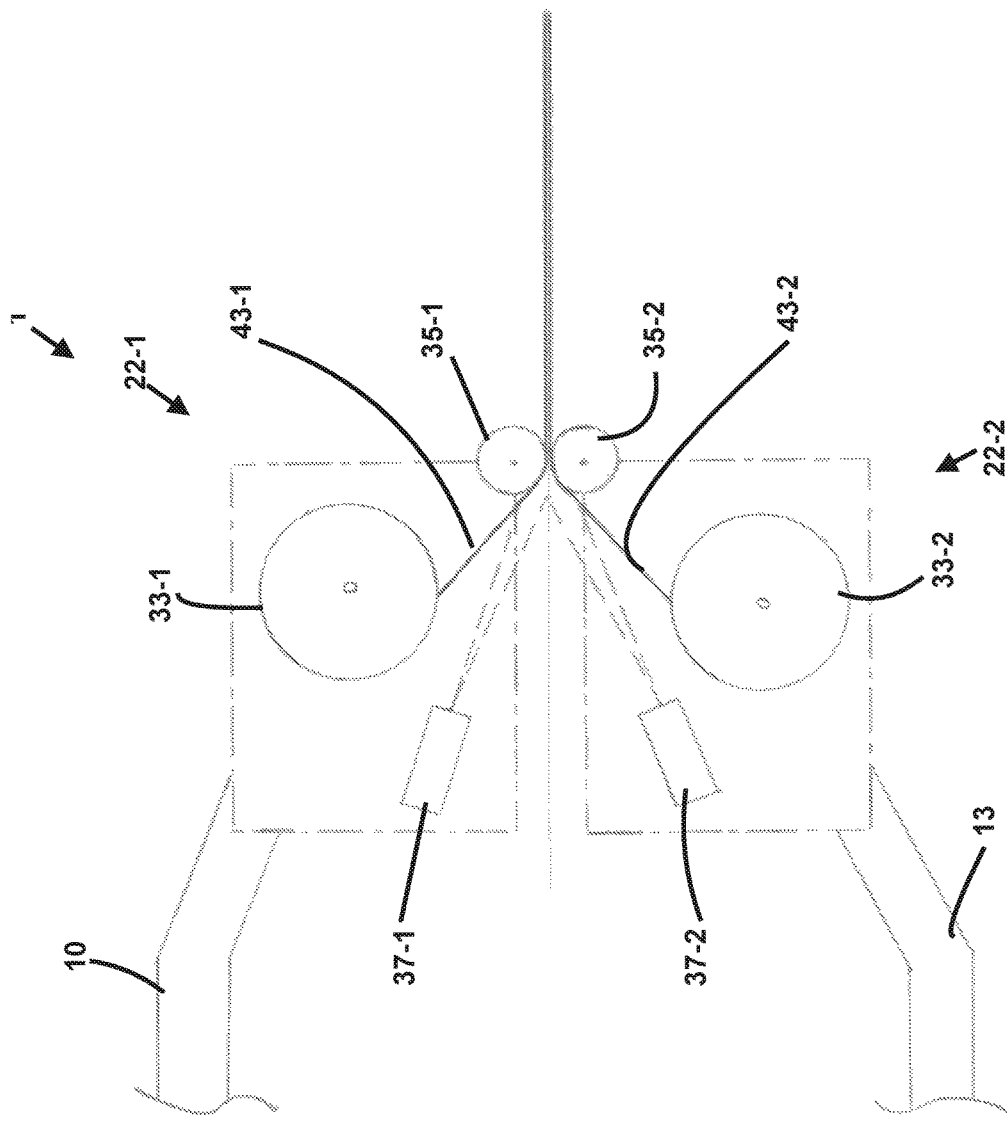

FIG. 30 shows the fiber placement apparatus 1 of FIG. 1. The fiber placement apparatus 1 includes two fiber tape placement units, namely an upper fiber tape placement unit 22-1 and a lower fiber tape placement unit 22-2, which act as placement heads.

The lower fiber tape placement unit 22-1 has parts that are similar to the parts of the upper fiber tape placement unit 22-2.

The upper fiber tape placement unit 22-1 has compaction rollers 35-1, a reel 33-1, and a heat source 37-1.

Similarly, the fiber tape placement unit 22-2 has compaction rollers 35-2, a reel 33-2, and a heat source 37-2.

In use, the upper fiber tape placement unit 22-1 and the lower fiber tape placement unit 22-2 are positioned on opposite side of a base structure 3.

In one implementation, as shown in FIG. 30, the reel 33-1 provides a tape 43-1 while the heat source 37-1 acts to heat the tape 43-1.

Similarly, the reel 33-2 provides a tape 43-2 while the heat source 37-2 acts to heat the tape 43-2.

The compaction rollers 35-1 and the compaction rollers 35-2 act to press the tape 43-1 and the tape 43-2 together to form one part, which can serve as a base structure.

Figure 31:
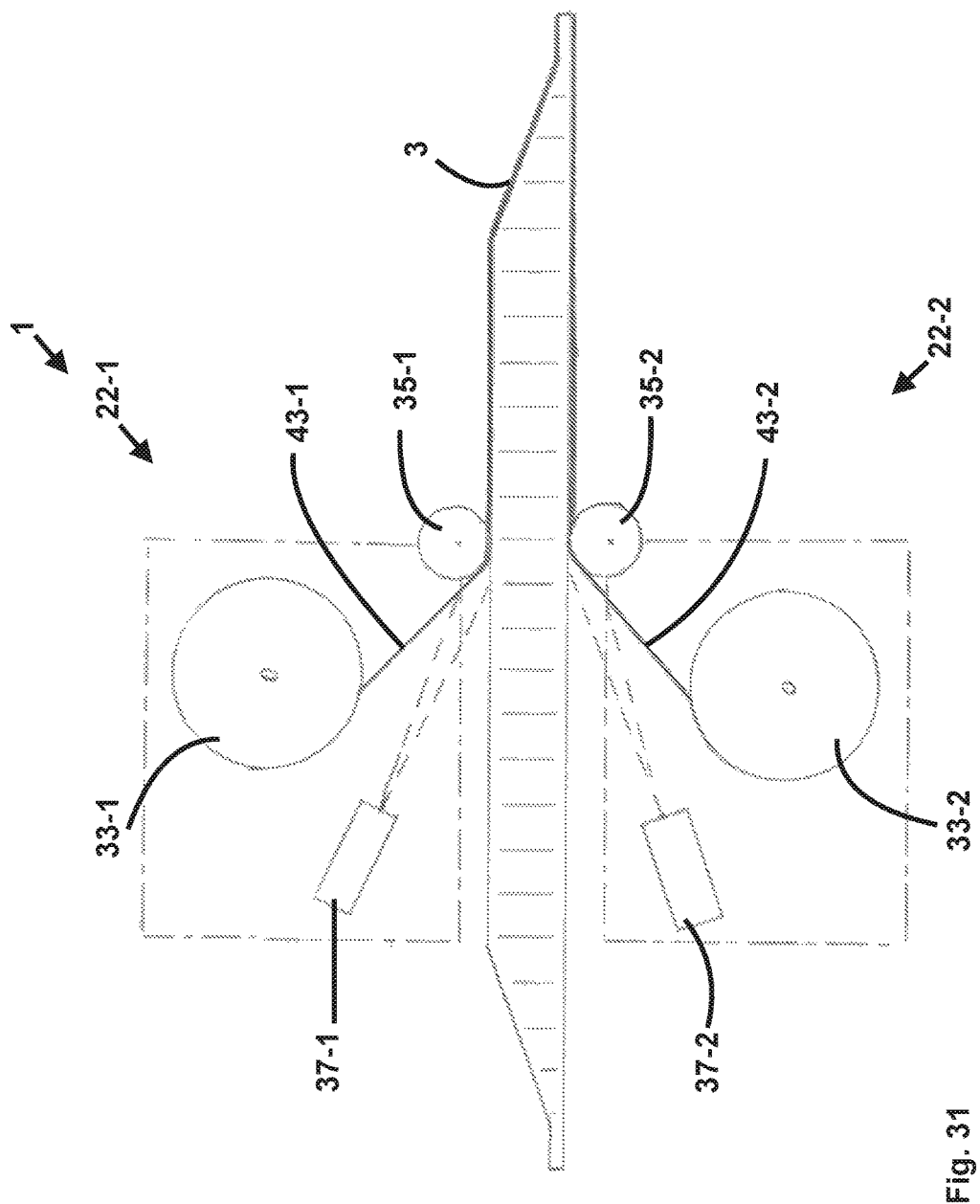

In another implementation, as shown in FIG. 31, the reel 33-1 provides a tape 43-1 on the upper surface of a base structure 3.

The heat source 37-1 acts to heat the tape 43-1 and an upper surface of the base structure 3.

Likewise, the reel 33-2 provides a tape 43-2 on a lower surface of the base structure 3.

1

The heat source 37-2 acts to heat the tape 43-2 and the lower surface of the base structure 3.

The compaction rollers 35-1 and the compaction rollers 35-2 act to press the tape 43-1 onto the upper surface of the base structure 3 and to press the tape 43-2 and the lower surface of the base structure 3.

The base structure 3 can include a sandwich core material, as shown in FIG. 31.

The sandwich core material is usually lightweight and is practically incompressible. The sandwich core material can be in the form of a honeycomb with multiple hollow cores or can include a piece of structural foam that is able to bear load without deforming.

Figure 32:
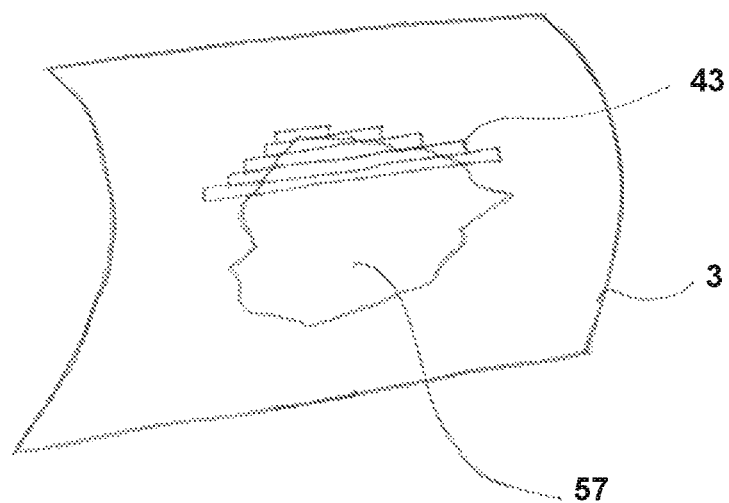
Figure 33:
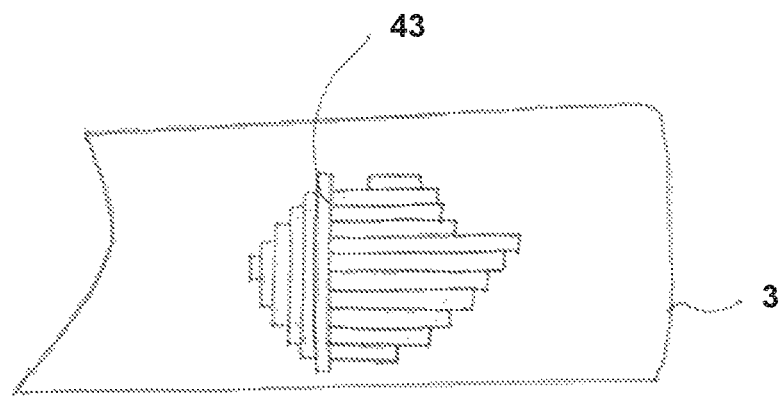

FIGS. 32 and 33 show the fiber placement apparatus 1 using the tape 43 to cover an opening 57 of a base structure 3.

In summary, the above embodiments provide a fiber placement apparatus that does not use tooling, molds, which can be in a negative form, or closed molds for injection molding.

The above embodiments also provide a composite manufacturing process that removes various distinct steps and does not require multiple apparatuses, which are used in the other fiber placement processes.

These embodiments therefore reduce cost and time in manufacturing of composites parts.

The embodiments can also be described with the following lists of features or elements being organized into an item list. The respective combinations of features, which are disclosed in the item list, are regarded as independent subject matter, respectively, that can also be combined with other features of the application.

1. A movable apparatus for forming a thermo-softening part, the apparatus comprising
   a first placement unit that comprises
      at least one first roller, wherein the first roller is movable in a first predetermined path, and
      a first heat source, and
   a second placement unit that comprises
      at least one second roller, which corresponds to the at least one first roller, wherein the second roller is movable in a second predetermined path,
   wherein
   the first heat source is
   provided for heating an elongated thermo-softening material to a predetermined temperature, and
   the at least one first roller and the at least one second roller are
   provided on opposite sides of the thermo-softening material, and
   provided to compress the thermo-softening material.

2. The movable apparatus according to item 1, wherein the first placement unit further comprises a first thermo-softening material storage and delivery device.

3. The movable apparatus according to item 2, wherein
   the first thermo-softening material storage and delivery device comprises a first reel.
4. The movable apparatus according to item 3, wherein
   the first reel is adapted for storing a first thermo-softening material in the form of a tape or in a form of a bundle of fibers.
5. The movable apparatus according to one of the above-mentioned items, wherein
   the first placement unit further comprises a first temperature sensor for measuring a temperature of the first thermo-softening material.
6. The movable apparatus according to one of the above-mentioned items, wherein
   the first placement unit further comprises a first distance measuring device for measuring a length of the compressed first thermo-softening material.
7. The movable apparatus according to one of the above-mentioned items, wherein
   the first placement unit further comprises a first thermo-softening material inspection device.
8. The movable apparatus according to one of the above-mentioned items, wherein
   the first placement unit further comprises a first device for cooling the first thermo-softening material.
9. The movable apparatus according to one of the above-mentioned items, wherein
   the first heat source comprises a first laser generation device.
10. The movable apparatus according item 9, wherein
    the first laser generation device produces a laser beam with changeable intensity, profile, size, and/or direction.
11. The movable apparatus according to one of the above-mentioned items, wherein
    the first placement unit further comprises a first preheating source and/or a first post-heating source.
12. The movable apparatus according to one of the above-mentioned items, wherein
    the second placement unit further comprises a second heat source.
13. The movable apparatus according to one of the above-mentioned items, wherein
    the second placement unit further comprises a second thermo-softening material storage and delivery device.
14. The movable apparatus according to item 13, wherein
    the second thermo-softening material storage and delivery device comprises a second reel.
15. The movable apparatus according to item 14, wherein
    the second reel is adapted for storing a second thermo-softening material in the form of a tape or in a form of a bundle of fibers.
16. The movable apparatus according to one of the above-mentioned items, wherein
    the second placement unit further comprises a second temperature sensor for measuring a temperature of the second thermo-softening material.
17. The movable apparatus according to one of the above-mentioned items, wherein
    the second placement unit further comprises a second distance measuring device for measuring a length of the compressed second thermo-softening material.
18. The movable apparatus according to one of the above-mentioned items, wherein
    the second placement unit further comprises a second thermo-softening material inspection device.
19. The movable apparatus according to one of the above-mentioned items, wherein
    the second placement unit further comprises a second device for cooling the second thermo-softening material.
20. The movable apparatus according to one of the above-mentioned items, wherein
    the second placement unit further comprises a second preheating source and/or a second post-heating source.
21. The movable apparatus according to one of the above-mentioned items, wherein
    the first placement unit and the second placement unit are adapted for immersing in liquid.
22. The movable apparatus according to one of the above-mentioned items, wherein
    the first roller and the second roller comprise a shape of a partial cone.
23. The movable apparatus according to one of the above-mentioned items further comprising a coupling device for attracting the first placement unit to the second placement unit by a magnetic force.
24. A movable apparatus for forming a thermo-softening part, the apparatus comprising
    a first placement unit that comprises
      at least one first roller, wherein the first roller is movable in a first predetermined path, and
      a heat source, and
    a second placement unit that comprises
      a gripper for supporting [and holding a part of] the thermo-softening part [such that the part does not slide or move perpendicularly with respect to the first determined path],
    wherein
    the heat source is
    provided for heating an elongated thermo-softening material to a predetermined temperature, and
    the at least one first roller and the gripper are
    provided on opposite sides of the thermo-softening material, and
    provided to compress [a part of] the thermo-softening material.
25. A robotic structure for forming a thermo-softening part comprising
    a movable apparatus according to one of the above-mentioned items, the apparatus comprising
      a first placement unit and
      a second placement unit,
    a first arm unit that comprises
      a first platform and
      a plurality of articulated interconnected first branch members being connected to the first platform, and being connected to the first placement unit, and
    a second arm unit that comprises
      a second platform and
      a plurality of articulated interconnected second branch members being connected to the second platform, and being connected to the second placement unit.
26. A robotic structure for forming a thermo-softening part comprising
    a movable apparatus according to one of the items 1 to 24, the apparatus comprising
      a first placement unit,
      a second placement unit, and
      a coupling device for attracting the first placement unit to the second placement unit by a magnetic force, and an arm unit that comprises
a platform and
a plurality of articulated interconnected branch members being connected to the platform, and being connected to the first placement unit.
27. An apparatus for forming a thermo-softening part, the apparatus, wherein
the apparatus is adapted for immersing in liquid
28. A method for forming a thermo-softening part, the method comprising
providing at least one first roller and at least one corresponding second roller on opposite sides of an elongated thermo-softening material,
heating the thermo-softening material [to soften it],
moving the at least one first roller in a first predetermined path, and moving the at least one second roller in a second predetermined path to compress the thermo-softening material
to shape the thermo-softening material and/or
to fuse the thermo-softening material onto a base structure, wherein the base structure is provided between the at least one first roller and the at least one second roller.

Although the above description contains much specificity, this should not be construed as limiting the scope of the embodiments but merely providing illustration of the foreseeable embodiments. The above stated advantages of the embodiments should not be construed especially as limiting the scope of the embodiments but merely to explain possible achievements if the described embodiments are put into practice. Thus, the scope of the embodiments should be determined by the claims and their equivalents, rather than by the examples given.

REFERENCE NUMBERS 1 fiber placement apparatus
1a fiber placement apparatus
1b fiber placement apparatus
2 base structure
5 robot
6 fiber placement module
7 computer
10 first articulated robotic arm
13 second articulated robotic arm
15 movable platform
15a movable platform
16 wheels
16a wheels
17 interconnected arms
17a interconnected arms
18 first arm
18a first arm
19 second arm
19a second arm
20 third arm
20a third arm
21 arm actuator
23 arm actuator
24 arm actuator
21a arm actuator
23a arm actuator
24a arm actuator
22 upper fiber tape placement unit
25 lower fiber tape placement unit
26 pre-heating source
27 post-heating source
28 tape inspection device
31 supporting frame
33 reel
35 compaction rollers
36 heating device
37 heat source
38 laser generation unit
39 cooling device
41 temperature sensor
43 tape
43a unidirectional fiber thermoplastic tape
44a filaments
44b thermoplastic material
44c spread roving
45 positional actuator
50 supporting frame
53 counter compaction rollers
55 positional actuator
67 magnetic clamping device
57 opening
60 flow chart
62 preparation mode
64 shaping mode
66 fusing mode
70 step
72 step
73 step
75 step
77 step
80 step
82 step
84 step
87 step
89 step
91 step
93 gripper
22-1 fiber tape placement unit
22-2 lower fiber tape placement unit
33-1 reel
33-2 reel
35-1 compaction roller
35-2 compaction roller
37-1 heat source
37-2 heat source

The invention claimed is:
1. A movable apparatus for forming a thermo-softening part, the apparatus comprising:
a stationary base structure of the thermo-softening part, the stationary base structure defining a first side and a second side disposed opposite from the first side
a first placement unit that comprises:
at least one first roller, the first roller configured to move in a first predetermined path conforming to the first side of the stationary base structure of the thermo-softening part, and
a first heat source, and
a second placement unit that comprises at least one second roller, which corresponds to the at least one first roller, the second roller configured to move in a second predetermined path conforming to the second side of the stationary base structure, and
wherein:
the first heat source is provided for heating an elongated thermo-softening material to a predetermined temperature, and
the at least one first roller and the at least one second roller are configured to compress the thermo-softening mate- rial and the stationary base structure, the at least one first roller configured to press the thermo-softening material to the first side of the stationary base structure, the at least one second roller configured to press against the second side of the stationary base structure opposite from the at least one first roller.

2. The movable apparatus according to claim 1, wherein the first placement unit further comprises a first thermo-softening material storage and delivery device.

3. The movable apparatus according to claim 2, wherein the first thermo-softening material storage and delivery device comprises a first reel.

4. The moveable apparatus according to claim 3, wherein the first reel is adapted for storing a first thermo-softening material in the form of a tape or in a form of a bundle of fibers.

5. The moveable apparatus according to claim 1, wherein the first placement unit further comprises a first temperature sensor for measuring a temperature of the first thermo-softening material.

6. The movable apparatus according to claim 1, wherein the first placement unit further comprises a first distance measuring device for measuring a length of the compressed first thermo-softening material, and wherein the first distance measuring device is an odometer.

7. The movable apparatus according to claim 1, wherein the first placement unit further comprises a first thermo-softening material inspection device, and wherein the first thermo-softening material inspection device is a camera.

8. The movable apparatus according to claim 1, wherein the first placement unit further comprises a first device for cooling the first thermo-softening material, and wherein the first device is an active cooling device configured to regulate a flow rate of a coolant.

9. The movable apparatus according to claim 1, wherein the first heat source comprises a first laser generation device.

10. The movable apparatus according to claim 9, wherein the first laser generation device produces a laser beam with changeable intensity, profile, size, and/or direction.

11. The movable apparatus according to claim 1, wherein the first placement unit further comprises a first pre-heating source and/or a first post-heating source.

12. The movable apparatus according to claim 1, wherein the first placement unit and the second placement unit are adapted for immersing in liquid.

13. The movable apparatus according to claim 1, wherein the first roller and the second roller comprise a shape of a frustum.

14. The movable apparatus according to claim 1 further comprising a coupling device for attracting the first placement unit to the second placement unit by a magnetic force.

15. The movable apparatus according to claim 9, wherein the first laser generation device is configured to heat both the first side of the stationary base structure and thermo-softening material.

16. The movable apparatus according to claim 1, wherein the first placement unit and the second placement unit are each configured to translate relative to the stationary base structure.

17. The movable apparatus according to claim 16, wherein the first placement unit is connected to a first articulated robot arm, and wherein the second placement unit is connected to a second articulated robot arm.

18. A movable apparatus for forming a thermo-softening part, the apparatus comprising:
   a base part of the thermo-softening part, the base part defining a first side and a second side disposed opposite from the first side;
   a first placement unit configured to translate relative to the base part, the first placement unit comprising:
      a first reel comprising a length of thermo-softening tape, the first reel configured to dispense the thermo-softening tape;
      a first roller configured to press the thermo-softening tape to the first side of the base part by rolling over the thermo-softening tape as the first placement unit translates in a first predetermined path conforming to the first side of the base part; and
   a second placement unit configured to translate relative to the base part, the second placement unit comprising a second roller engaging the second side of the base part opposite from the first roller, the second roller configured to roll over the first side of the base part in a second predetermined path conforming to the second side of the base part, a portion of the thermo-softening tape and a portion of the base part positioned between the first roller and the second roller, the portion of the thermo-softening tape compressed against the portion of the base part.

* * * * *